United States Patent
Manglik et al.

(10) Patent No.: US 12,499,599 B1
(45) Date of Patent: Dec. 16, 2025

(54) METHOD AND DEVICE FOR GENERATING AN ANIMATION GRAPH

(71) Applicant: Apple Inc., Cupertino, CA (US)

(72) Inventors: Aashi Manglik, Sunnyvale, CA (US); Siva Chandra Mouli Sivapurapu, Santa Clara, CA (US); Shaun D. Budhram, Los Gatos, CA (US); Edward Ahn, San Francisco, CA (US); Mark E. Drummond, Palo Alto, CA (US); Noah Gamboa, San Francisco, CA (US); Behrooz Mahasseni, San Jose, CA (US)

(73) Assignee: APPLE INC., Cupertino, CA (US)

( * ) Notice: Subject to any disclaimer, the term of this patent is extended or adjusted under 35 U.S.C. 154(b) by 153 days.

(21) Appl. No.: 17/949,403

(22) Filed: Sep. 21, 2022

Related U.S. Application Data

(60) Provisional application No. 63/247,667, filed on Sep. 23, 2021.

(51) Int. Cl.
  *G06T 13/00* (2011.01)
(52) U.S. Cl.
  CPC .................... *G06T 13/00* (2013.01)
(58) Field of Classification Search
  CPC ......... G06T 13/00; G06T 13/20; G06T 13/40; G06T 13/80
  See application file for complete search history.

(56) References Cited

U.S. PATENT DOCUMENTS

| | | |
|---|---|---|
| 7,574,332 B2 | 8/2009 | Ballin et al. |
| 2011/0007079 A1 | 1/2011 | Perez et al. |
| 2017/0270702 A1 | 9/2017 | Gauthier et al. |

(Continued)

FOREIGN PATENT DOCUMENTS

| | | |
|---|---|---|
| WO | 2010107575 A2 | 9/2010 |
| WO | 2019212698 A1 | 11/2019 |

OTHER PUBLICATIONS

Thompson, P. (2015). Animation of 3D Avatars Progress Report. Studentnet.cs.manchester.ac.uk. (Year: 2015).*

(Continued)

*Primary Examiner* — Devona E Faulk
*Assistant Examiner* — Donna J. Ricks
(74) *Attorney, Agent, or Firm* — Fernando & Partners, LLP

(57) ABSTRACT

In some implementations, the method includes: obtaining a plurality of animations; determining initial and end motion states for each of the plurality of animations; generating an animation graph including nodes for each of the plurality of animations by connecting, with a directional edge, a first node with an end motion state to a second node with an initial motion state that matches the end motion state of the first node; generating a transitional animation that is not included among the plurality of animations from an initial reference motion state to a target motion state that corresponds to a path that traverses the animation graph from a third node associated with the initial reference motion state to a fourth node associated with the target motion state; and updating the animation graph by removing one or more nodes from the animation graph based at least in part on the transitional animation.

23 Claims, 20 Drawing Sheets

(56) References Cited

U.S. PATENT DOCUMENTS

2021/0166459 A1\*  6/2021  Miller, IV ............. G06F 1/1637

OTHER PUBLICATIONS

Sung, M. et al. 2005. Fast and accurate goal-directed motion synthesis for crowds. In proceedings of the 2005 ACM Siggraph/Eurographics symposium on Computer animation (SCA '05). Association for Computing Machinery, New York, NY, USA 291-300. https://doi.org/10.1145/1073368.1073410 (Year: 2005).\*

Lucas Kovar et al., "Motion Graphs," ACM SIGGRAPH 2008 classes, 2008, pp. 1-10.

\* cited by examiner

METHOD AND DEVICE FOR GENERATING AN ANIMATION GRAPH

CROSS-REFERENCE TO RELATED APPLICATIONS

This application claims the benefit of U.S. Provisional Patent App. No. 63/247,667, filed on Sep. 23, 2021, which is incorporated by reference in its entirety.

TECHNICAL FIELD

The present disclosure generally relates to animations and, in particular, to systems, methods, and methods for generating and utilizing an animation graph.

BACKGROUND

Given a library of hand-crafted animations for a virtual agent (VA) or character (e.g., a robot dog), a motion output system may not be able to provide a transition from a current/initial state (e.g., sleeping, sitting, walking, idle, etc.) to a target state (e.g., barking, sniffing, eating, etc.) unless such a transition is included in the library of hand-crafted animations.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
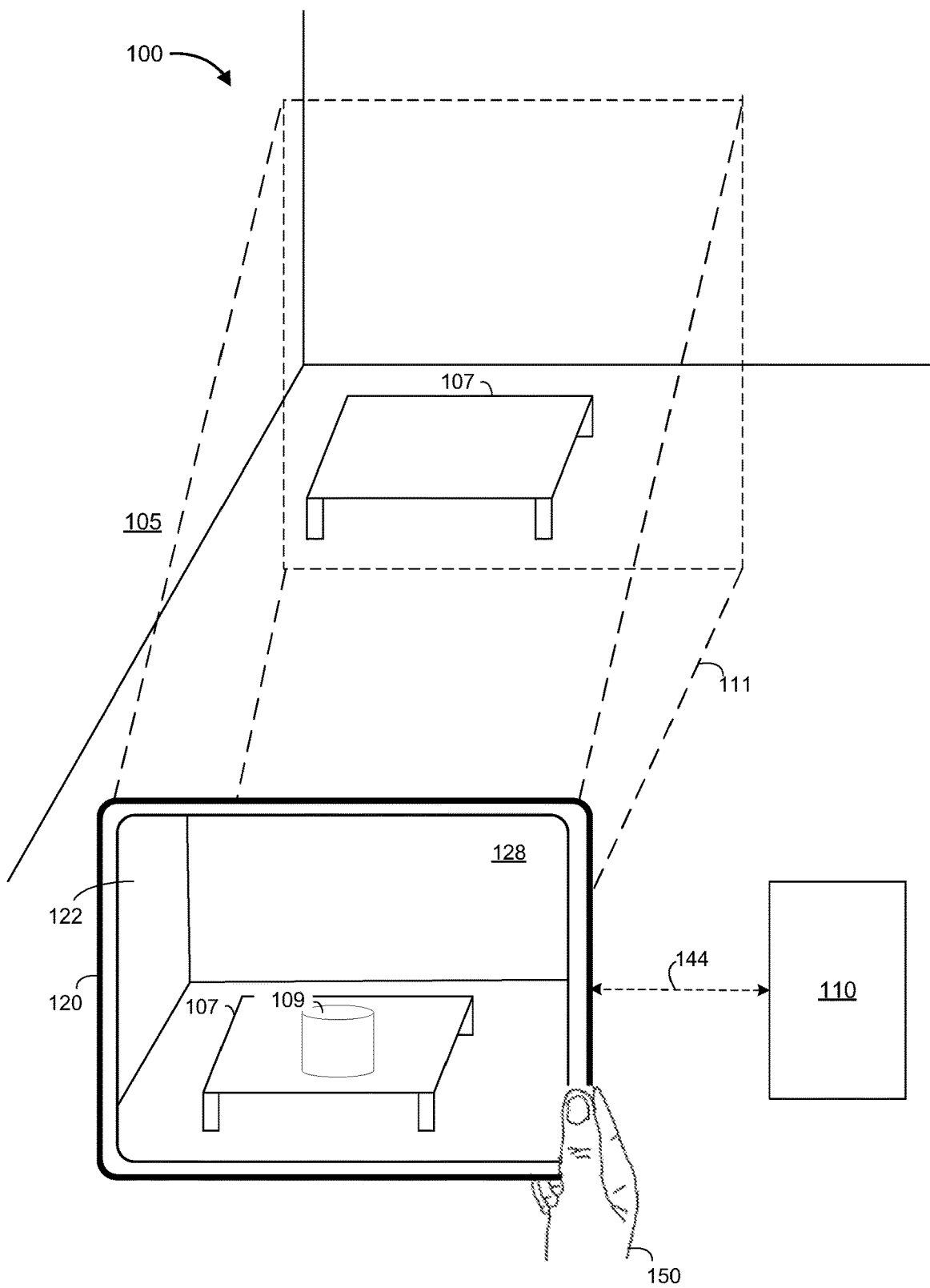
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for generating and utilizing an animation graph. According to some implementations, the method is performed at a computing system including non-transitory memory and one or more processors, wherein the computing system is communicatively coupled to a display device and one or more input devices. The method includes: obtaining a plurality of pre-existing animations; determining an initial motion state and an end motion state for each of the plurality of pre-existing animations; generating an animation graph including nodes for each of the plurality of pre-existing animations by connecting, with a directional edge, a first node with an end motion state to a second node with an initial motion state that matches the end motion state of the first node; generating a transitional animation that is not included among the plurality of pre-existing animations from an initial reference motion state to a target motion state that corresponds to a path that traverses the animation graph from a third node associated with the initial reference motion state to a fourth node associated with the target motion state; and updating the animation graph by removing one or more nodes from the animation graph based at least in part on the transitional animation.

Various implementations disclosed herein include devices, systems, and methods for generating a motion graph. According to some implementations, the method is performed at a computing system including non-transitory memory and one or more processors, wherein the computing system is communicatively coupled to a display device and one or more input devices. The method includes: obtaining source content associated with an asset; encoding the source content based on one or more embedding space parameters to generate an initial motion graph; providing the initial motion graph to a graph neural network; and after providing the initial motion graph to the graph neural network, obtaining a modified motion graph including at least one of: a greater number of edges than the initial motion graph or a lesser number of edges than the initial motion graph.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120.

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3. For example, the electronic device 120 corresponds to a near-eye system, mobile phone, tablet, laptop, wearable computing device, or the like.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
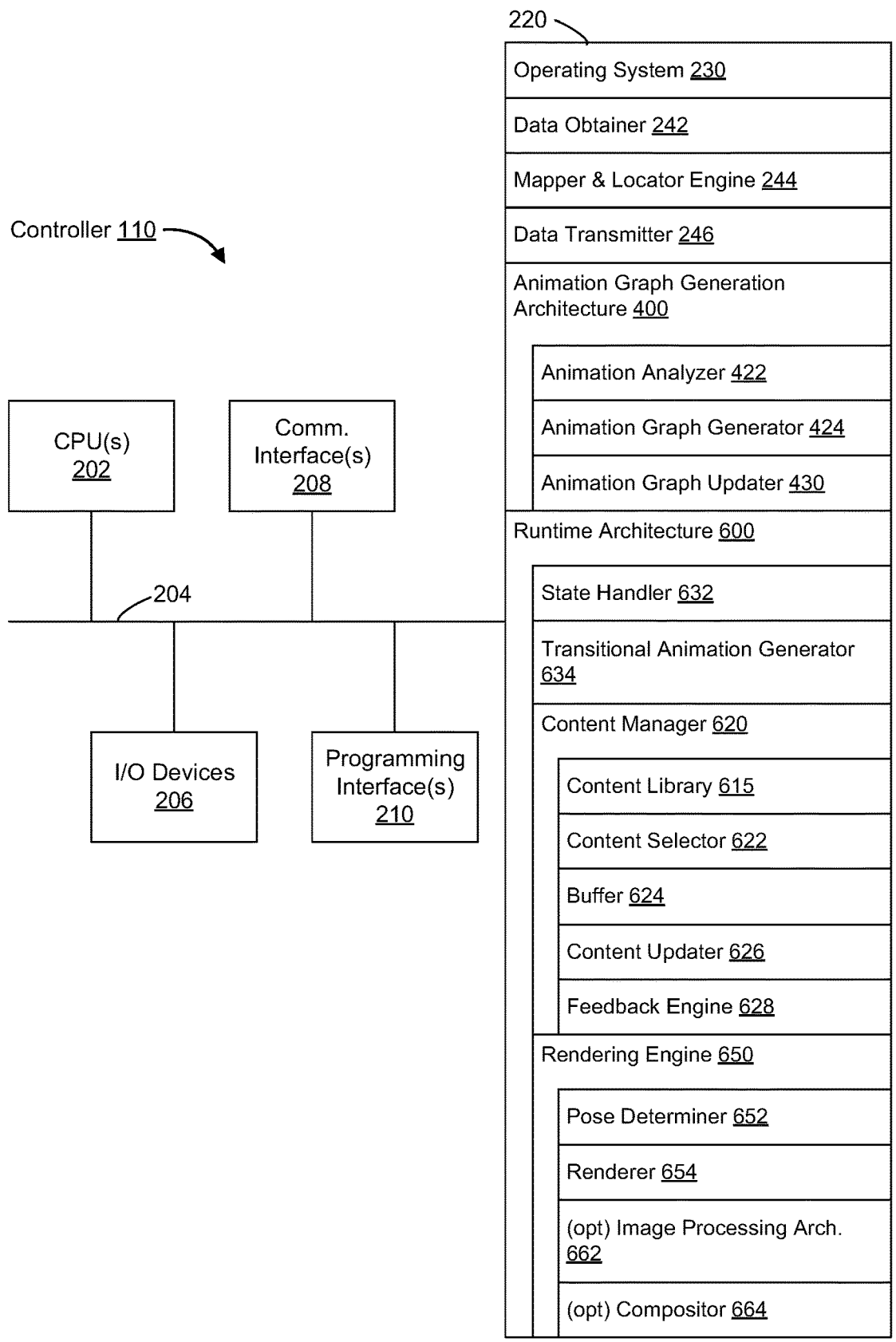
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touch-screen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, blended animation(s), etc.) to at least the electronic device 120 and optionally one or more other devices. To that end, in various implementations, the data transmitter 246 includes instructions and/or logic therefor, and heuristics and metadata therefor.

In some implementations, an animation graph generation architecture 400 is configured to generate and update an animation graph. The animation graph generation architecture 400 is described in more detail below with reference to FIG. 4A. To that end, in various implementations, the animation graph generation architecture 400 includes instructions and/or logic therefor, and heuristics and metadata therefor. In some implementations, the animation graph generation architecture 400 includes an animation analyzer 422, an animation graph generator 424, and an animation graph updater 430.

In some implementations, the animation analyzer 422 is configured to generate labels and metadata for a plurality of input animations. The animation analyzer 422 is described in more detail below with reference to FIG. 4A. To that end, in various implementations, the animation analyzer 422 includes instructions and/or logic therefor, and heuristics and metadata therefor.

In some implementations, the animation graph generator 424 is configured to generate an animation graph based on the plurality of input animations and the labels and metadata generated therefor by the animation analyzer 422. The animation graph generator 424 is described in more detail below with reference to FIG. 4A. To that end, in various implementations, the animation graph generator 424 includes instructions and/or logic therefor, and heuristics and metadata therefor.

In some implementations, the animation graph updater 430 is configured to update or otherwise modify the animation graph over time based on a user request/command, a change in context, user preferences, usage history, etc. to generate an updated animation graph. In some implementations, updating or otherwise modifying the animation graph includes one or more of: adding one or more nodes and/or edges to the animation graph; removing one or more nodes and/or edges from the animation graph; inserting an ML node into the animation graph to generate a non-transitional output motion; or replacing a non-transitional node within the animation graph with an ML node to generate the non-transitional output motion. The animation graph updater 430 is described in more detail below with reference to FIG. 4A. To that end, in various implementations, the animation graph updater 430 includes instructions and/or logic therefor, and heuristics and metadata therefor.

In some implementations, a runtime architecture 600 is configured to manage, render, and present an XR environment 128. The runtime architecture 600 is described in more detail below with reference to FIG. 6A. To that end, in various implementations, the runtime architecture 600 includes instructions and/or logic therefor, and heuristics and metadata therefor. In some implementations, the runtime architecture 600 includes: a state handler 632, a transitional animation generator 634, a content manager 620, and a rendering engine 650.

In some implementations, the state handler 632 is configured to generate the initial and target motion states for the new transitional animation based on: the one or more user inputs provided by the user 150 that are associated with generating a new transitional animation including at least one of the initial reference motion state and the target motion state; and previous state information from the buffer 624. The state handler 632 is described in more detail below with reference to FIG. 6A. To that end, in various implementations, the state handler 632 includes instructions and/or logic therefor, and heuristics and metadata therefor.

In some implementations, the transitional animation generator 634 is configured to generate a transitional animation (or a motion output associated therewith) based on the animation graph and the initial and target motion states. The transitional animation generator 634 is described in more detail below with reference to FIG. 6A. To that end, in various implementations, the transitional animation generator 634 includes instructions and/or logic therefor, and heuristics and metadata therefor.

In some implementations, the content manager 620 is configured to manage and update the layout, setup, structure, and/or the like for the UI or XR environment during runtime. The content manager 620 is described in more detail below with reference to FIG. 6A. To that end, in various implementations, the content manager 620 includes instructions and/or logic therefor, and heuristics and metadata therefor. In some implementations, the content manager 620 includes: a content library 615, a content selector 622, a buffer 624, a content updater 626, and a feedback engine 628.

In some implementations, the content selector 622 is configured to select XR content (sometimes also referred to herein as "graphical content" or "virtual content") from the content library 615 based on one or more user requests and/or inputs (e.g., a voice command, a selection from a user interface (UI) menu of XR content items or VAs, and/or the like). The content selector 622 is described in more detail below with reference to FIG. 6A. To that end, in various implementations, the content selector 622 includes instructions and/or logic therefor, and heuristics and metadata therefor.

In some implementations, the content library 615 includes a plurality of content items such as audio/visual (A/V) content and/or XR content, VAs, objects, items, scenery, etc. As one example, the XR content includes 3D reconstructions of user captured videos, movies, TV episodes, and/or other XR content. In some implementations, the content library 615 is pre-populated or manually authored by the user 150. In some implementations, the content library 615 is located local relative to the controller 110. In some implementations, the content library 615 is located remote from the controller 110 (e.g., at a remote server, a cloud server, or the like).

In some implementations, the buffer 624 is configured to store XR content, XR content states, VAs, VA states, a rendered image frame, other state information, and/or the like for one or more past iterations, instances, and/or frames. The content buffer 624 is described in more detail below with reference to FIG. 6A. One of ordinary skill in the art will appreciate that various buffer types may be suitable for the buffer 624. To that end, in various implementations, the buffer 624 includes instructions and/or logic therefor, and heuristics and metadata therefor.

In some implementations, the content updater 626 is configured to update the XR environment 128 (and the XR content, VA(s), and/or the like therein) to include the transitional animation. In some implementations, the content updater 626 is also configured to modify the UI or the XR environment over time based on translational or rotational movement of the electronic device 120 or physical objects within the physical environment 105, user inputs (e.g., a change in context, hand/extremity tracking inputs, eye tracking inputs, touch inputs, voice commands, modification/manipulation inputs with the physical object, and/or the like), and/or the like. The content updater 626 is described in more detail below with reference to FIG. 6A. To that end, in various implementations, the content updater 626 includes instructions and/or logic therefor, and heuristics and metadata therefor.

In some implementations, the feedback engine 628 is configured to generate sensory feedback (e.g., visual feedback such as text or lighting changes, audio feedback, haptic feedback, etc.) associated with the UI or the XR environment. The feedback engine 628 is described in more detail below with reference to FIG. 6A. To that end, in various implementations, the feedback engine 628 includes instructions and/or logic therefor, and heuristics and metadata therefor.

In some implementations, the rendering engine 650 is configured to render the UI or the XR environment (sometimes also referred to herein as a "graphical environment" or "virtual environment") or image frame(s) associated therewith. To that end, in various implementations, the rendering engine 650 includes instructions and/or logic therefor, and heuristics and metadata therefor. In some implementations, the rendering engine 650 includes: a pose determiner 652, a renderer 654, an optional image processing architecture 662, and an optional compositor 664.

In some implementations, the pose determiner 652 is configured to determine a current camera pose of the electronic device 120 and/or the user 150 relative to the A/V content and/or XR content. The pose determiner 652 is described in more detail below with reference to FIG. 6A. To that end, in various implementations, the pose determiner 652 includes instructions and/or logic therefor, and heuristics and metadata therefor.

In some implementations, the renderer 654 is configured to render the A/V content and/or the XR content according to the current camera pose relative thereto. The renderer 654 is described in more detail below with reference to FIG. 6A. To that end, in various implementations, the renderer 654 includes instructions and/or logic therefor, and heuristics and metadata therefor.

In some implementations, the image processing architecture 662 is configured to obtain (e.g., receive, retrieve, or capture) an image stream including one or more images of the physical environment 105 from the current camera pose of the electronic device 120 and/or the user 150. In some implementations, the image processing architecture 662 is also configured to perform one or more image processing operations on the image stream such as warping, color correction, gamma correction, sharpening, noise reduction, white balance, and/or the like. The image processing architecture 662 is described in more detail below with reference to FIG. 6A. To that end, in various implementations, the image processing architecture 662 includes instructions and/or logic therefor, and heuristics and metadata therefor.

In some implementations, the compositor 664 is configured to composite the rendered A/V content and/or XR content with the processed image stream of the physical environment 105 from the image processing architecture 662 to produce rendered image frames of the XR environment for display. The compositor 664 is described in more detail below with reference to FIG. 6A. To that end, in various implementations, the compositor 664 includes instructions and/or logic therefor, and heuristics and metadata therefor.

Although the data obtainer 242, the mapper and locator engine 244, the data transmitter 246, the animation graph generation architecture 400, and the runtime architecture 600 are shown as residing on a single device (e.g., the controller 110), it should be understood that in other implementations, any combination of the data obtainer 242, the mapper and locator engine 244, the data transmitter 246, the animation graph generation architecture 400, and the runtime architecture 600 may be located in separate computing devices.

In some implementations, the functions and/or components of the controller 110 are combined with or provided by the electronic device 120 shown below in FIG. 3. Moreover, FIG. 2 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
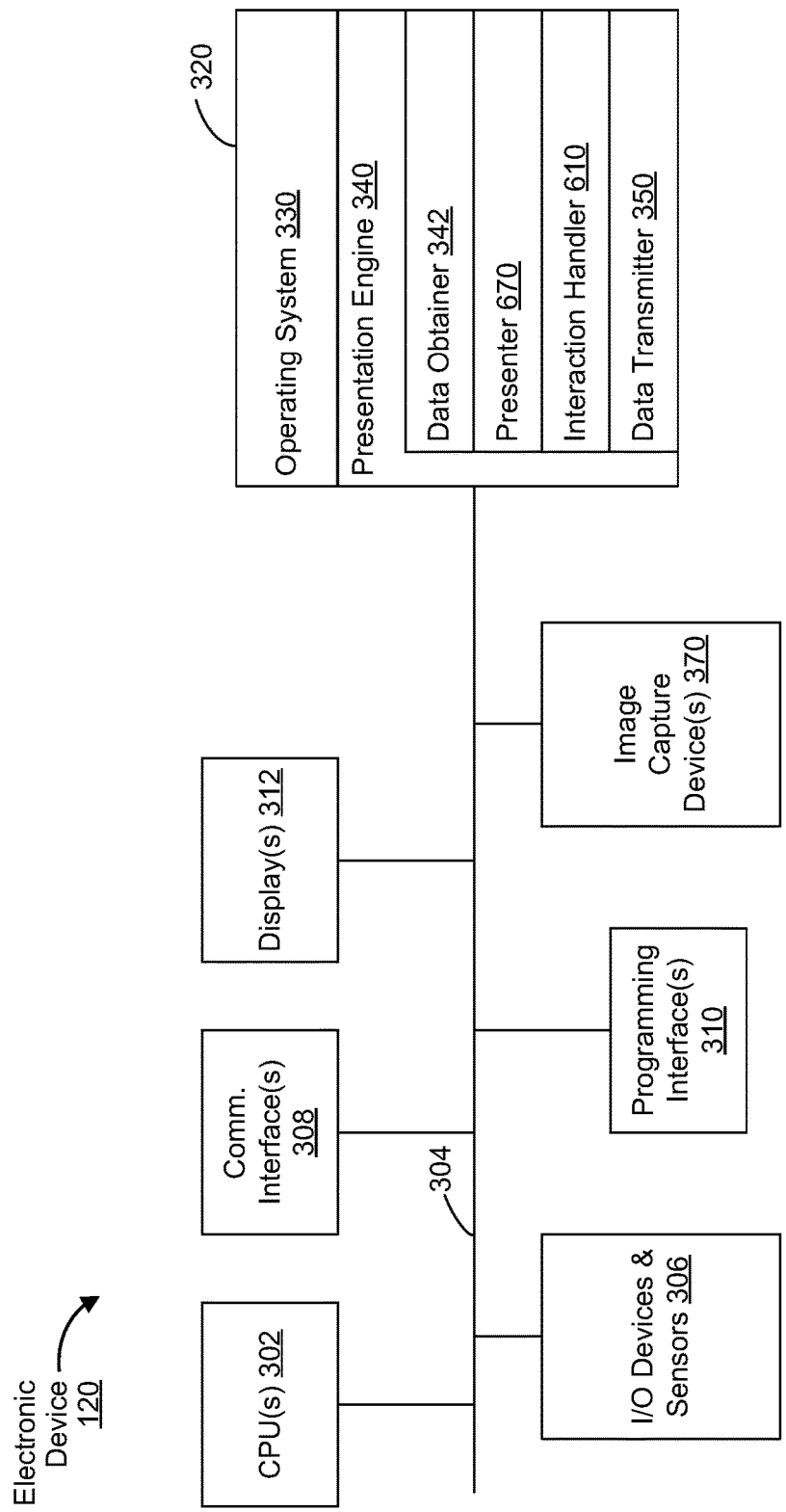
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 670, an interaction handler 610, and a data transmitter 350.

In some implementations, the data obtainer 342 is configured to obtain data (e.g., presentation data such as rendered image frames associated with the user interface or the XR environment, blended animation(s), input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the presenter 670 is configured to present and update A/V content and/or XR content (e.g., the rendered image frames associated with the UI or the XR environment) via the one or more displays 312. To that end, in various implementations, the presenter 670 includes instructions and/or logic therefor, and heuristics and metadata therefor.

In some implementations, the interaction handler 610 is configured to detect user interactions with the presented A/V content, VAs, and/or XR content (e.g., gestural inputs detected via hand tracking, gaze inputs detected via eye tracking, voice commands, touch inputs, and/or the like). To that end, in various implementations, the interaction handler 610 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the presenter 670, the interaction handler 610, and the data transmitter 350 are shown as residing on a single device (e.g., the electronic device 120), it should be understood that in other implementations, any combination of the data obtainer 342, the presenter 670, the interaction handler 610, and the data transmitter 350 may be located in separate computing devices.

Moreover, FIG. 3 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
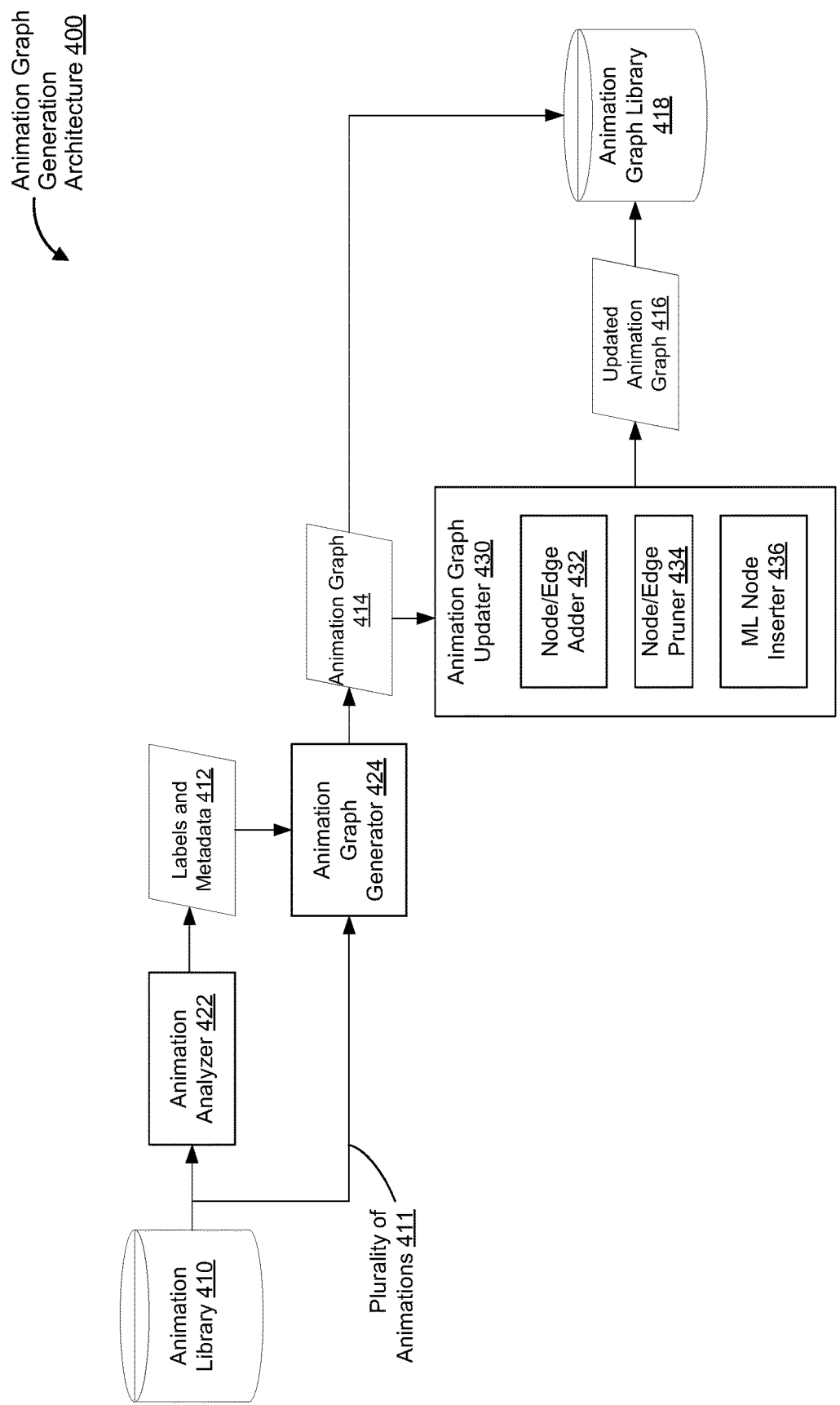
FIG. 4A is a block diagram of an example animation graph generation architecture in accordance with some implementations.

FIG. 4A is a block diagram of an example animation graph generation architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the animation graph generation architecture 400 is included in a computing system such as the controller 110 shown in FIGS. 1 and 2; the electronic device 120 shown in FIGS. 1 and 3; and/or a suitable combination thereof. In some implementations, the animation graph generation architecture 400 includes software, firmware, hardware, an application-specific integrated circuit (ASIC), a field-programmable gate array (FPGA), and/or the like.

As shown in FIG. 4A, the animation analyzer 422 ingests a plurality of animations 411 from the animation library 410 and obtains (e.g., receives, retrieves, determines generates, etc.) labels and metadata 412 for the plurality of animations 411. For example, the animation library 410 includes a plurality of pre-existing animations associated with a specific domain, character, virtual agent (VA), or the like. As another example, the animation library 410 includes a plurality of sets of pre-existing animations, where each set of pre-existing animations is associated with a specific domain, character, virtual agent (VA), or the like. As one example, the plurality of animations 411 correspond to pre-existing animations associated with a dog-like VA such as sit, stand, beg, bark, sniff, sleep, rollover, etc. animations. In this example, the plurality of animations 411 may have been hand-crafted or manually authored for the dog-like VA.

Figure 4B:
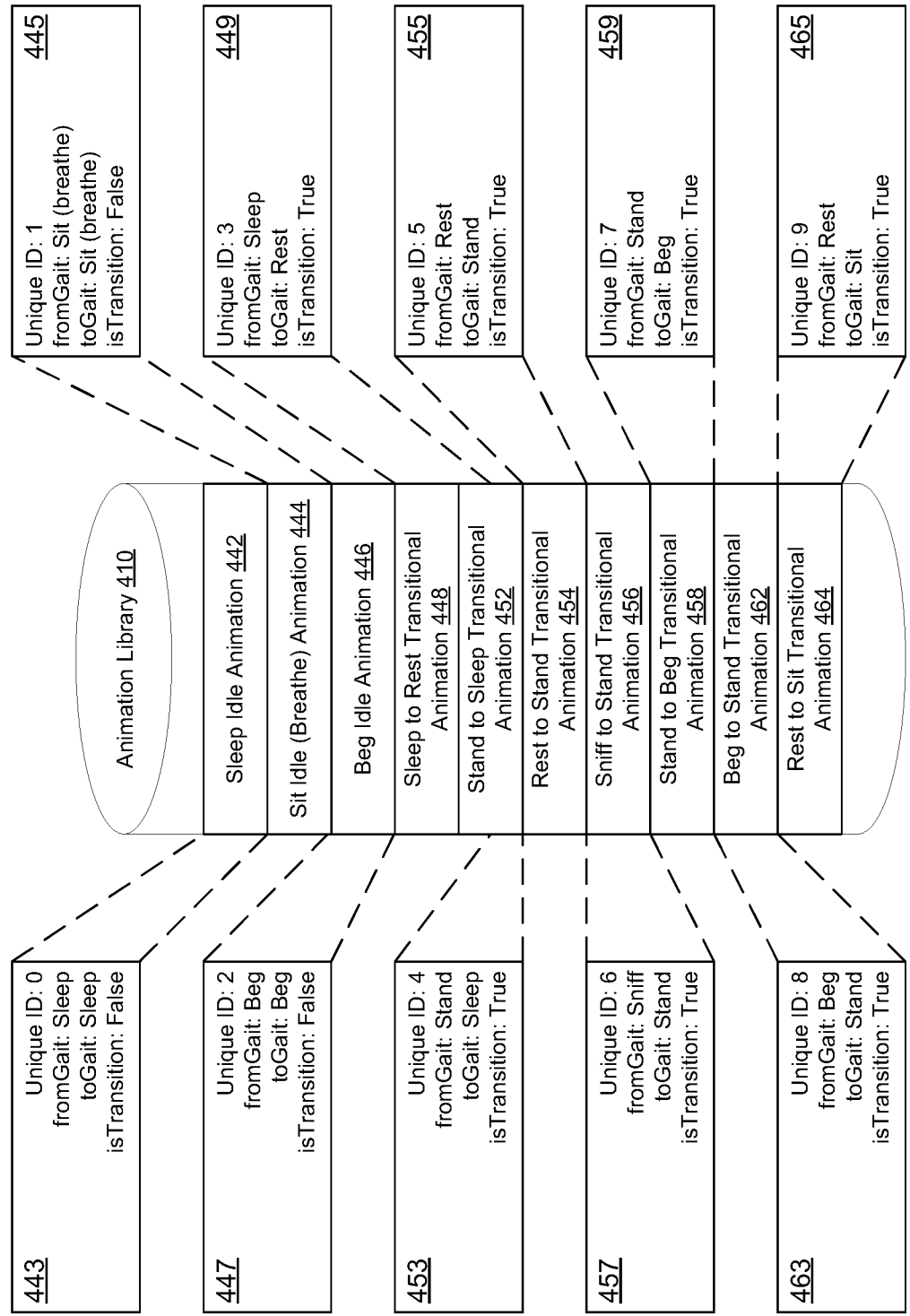
FIG. 4B illustrates example metadata for pre-existing animation in an animation library in accordance with some implementations.

As shown in FIG. 4B, the animation library 410 includes a sleep idle animation 442, a sit idle (breathe) animation 444, a beg idle animation 446, a sleep to rest transitional animation 448, a stand to sleep transitional animation 452, a rest to stand transitional animation 454, a sniff to stand transitional animation 456, a stand to beg transitional animation 458, a beg to stand transitional animation 462, and a rest to sit transitional animation 464. One of ordinary skill in the art will appreciate that the aforementioned animations within the animation library 410 are merely example animations associated with a dog-like VA that may be modified, replaced, removed, added to, or the like in various other implementations.

In some implementations, at least some of the plurality of animations 411 correspond to non-transitional animations with similar initial and end motion states such as the sleep idle animation 442, the sit idle (breather) animation 444, the beg idle animation 446, and/or the like non-transitional animations. In some implementations, at least some of the plurality of animations 411 correspond to transitional animations with dissimilar initial and end motion states such as the sleep to rest transitional animation 448, the stand to sleep transitional animation 452, the rest to stand transitional animation 454, the sniff to stand transitional animation 456, the stand to beg transitional animation 458, the beg to stand transitional animation 462, and the rest to sit transitional animation 464, and/or the like transitional animations.

As shown in FIG. 4B, each of the animations 442, 444, 446, 448, 452, 454, 456, 458, 462, and 464 in the animation library 410 is associated with metadata information 443, 445, 447, 449, 453, 455, 457, 459, 463, and 465, respectively. In FIG. 4B, the metadata information 443, 445, 447, 449, 453, 455, 457, 459, 463, and 465 each include a "unique ID" value (e.g., a sequence or serial number), a "fromGait" value (e.g., an initial motion state), a "toGait" value (e.g., an end motion state), and an "isTransition" value (e.g., a true or false flag). For example, the labels and metadata 412 generated by the animation analyzer 422 correspond to the metadata information 443, 445, 447, 449, 453, 455, 457, 459, 463, and 465.

As shown in FIG. 4A, the animation graph generator 424 ingests the plurality of animations 411 from the animation library 410 and the labels and metadata 412. In FIG. 4A, the animation graph generator 424 generates an animation graph 414 based on the plurality of animations 411 from the animation library 410 and the labels and metadata 412. In some implementations, the animation graph generator 424 stores the animation graph 414 in an animation graph library 418.

Figure 4C:
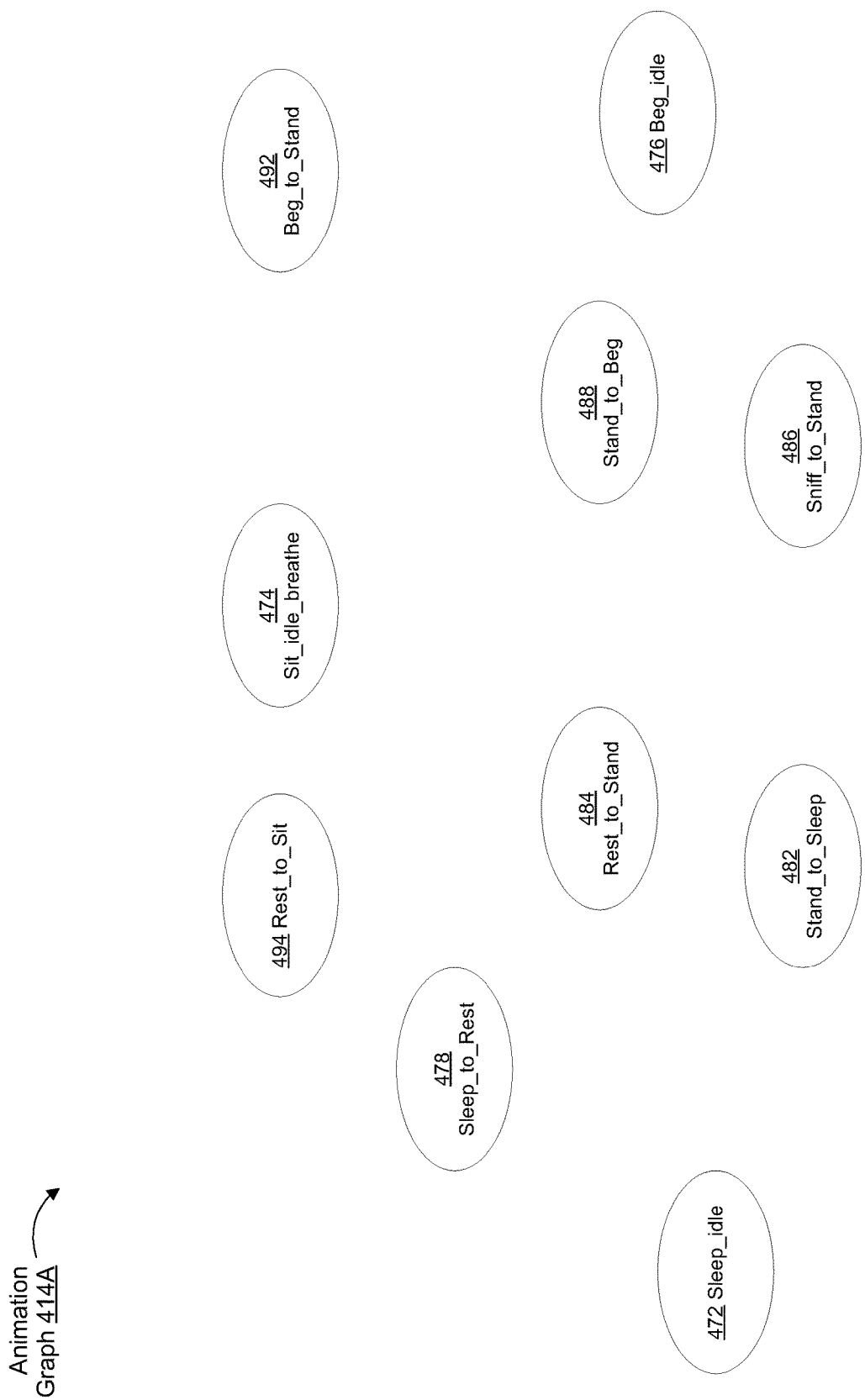
FIG. 4C illustrates an intermediate state for an animation graph in accordance with some implementations.
Figure 4D:
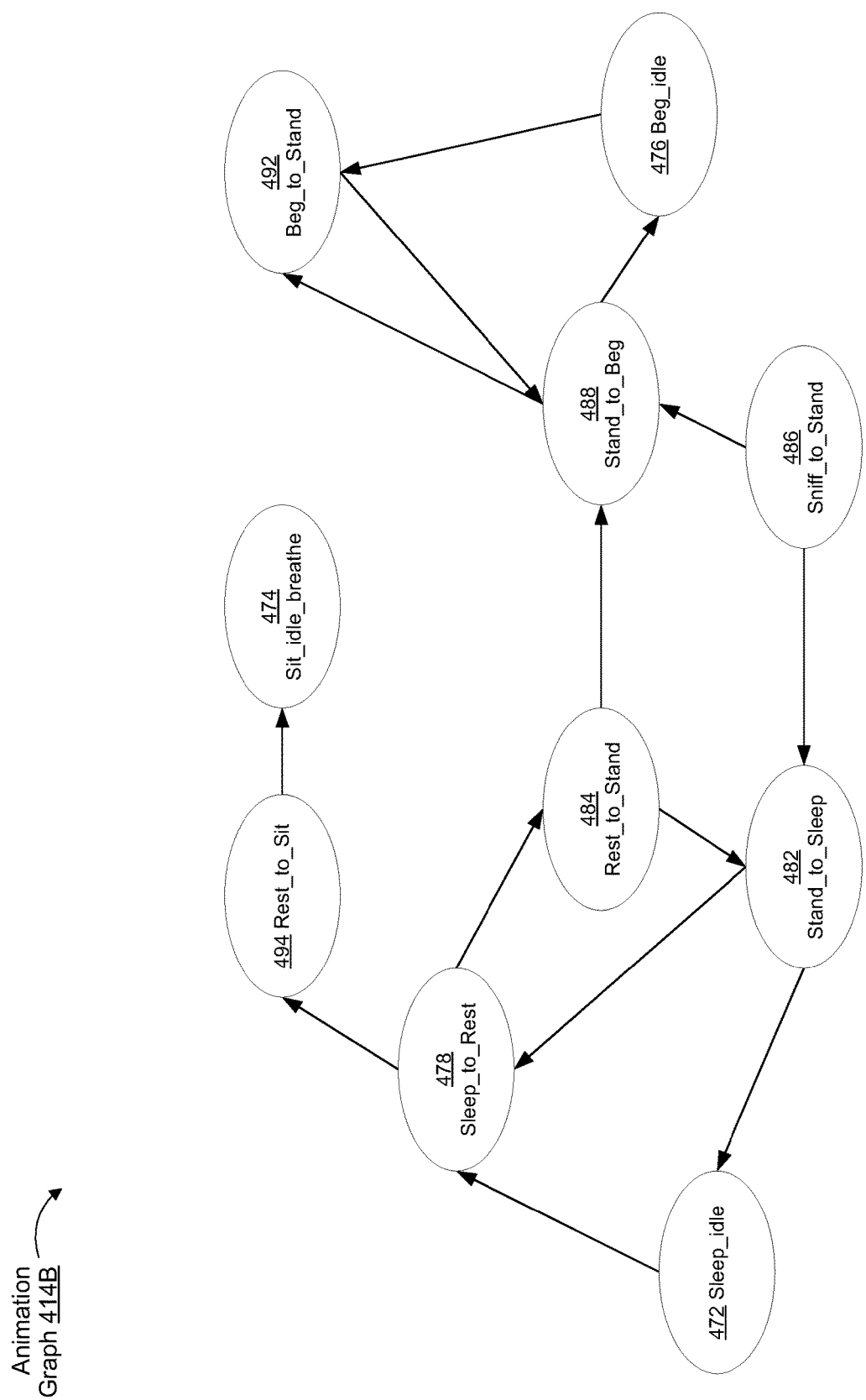
FIG. 4D illustrates an example animation graph in accordance with some implementations.

FIG. 4C illustrates an intermediate state for the animation graph 414A whereby the animations 442, 444, 446, 448, 452, 454, 456, 458, 462, and 464 are associated with nodes 472, 474, 476, 478, 482, 484, 486, 488, 492, and 494, respectively. FIG. 4D illustrates the animation graph 414B whereby the nodes 472, 474, 476, 478, 482, 484, 486, 488, 492, and 494 are connected with directed edges when an end motion state of a first node matches an initial motion state of a second node. As one example, the node 478 (e.g., associated with the sleep to rest transitional animation 448) with a "rest" end motion state value is connected to the node 484 (e.g., associated with the rest to stand transitional animation 454) with a "rest" initial motion state value via a directional edge that proceeds from the node 478 to the node 484.

As shown in FIG. 4A, the animation graph updater 430 optionally updates or otherwise modifies the animation graph 414 over time based on a user request/command, a change in context, user preferences, usage history, etc. to generate an updated animation graph 416. In some implementations, the animation graph updater 430 stores the updated animation graph 416 in the animation graph library 418. In some implementations, the animation graph updater 430 includes a node/edge adder 432, a node/edge pruner 434, and a machine learning (ML) node inserter 436.

In various implementations, the node/edge adder 432 adds one or more nodes and/or edges to the animation graph 414 to increase the number of connected nodes and/or to connect unconnected nodes. In various implementations, the node/edge pruner 434 removes one or more nodes and/or edges from the animation graph 414 that are unconnected, least frequently used, unrelated to a current story, not preferred by the user 150, and/or the like. In various implementations, the ML node inserter 436 inserts an ML sub-system into the animation graph 414 to generate a non-transitional output motion. For example, the non-transitional output motion corresponds to walking, running, jumping, sleeping idle, sitting idle, and/or the like.

In various implementations, the ML node inserter 436 replaces a non-transitional node within the animation graph 414 with an ML sub-system to generate the non-transitional output motion. In various implementations, the ML node inserter 436 inserts an ML sub-system into the animation graph 414 to generate a transitional output motion. In various implementations, the ML node inserter 436 replaces a transitional node within the animation graph 414 with an ML sub-system to generate the transitional output motion.

As used herein, the non-transitional node may correspond to an idle animation with similar start and end states such as sleeping idle, sitting idle, begging idle, or the like. As used herein, a transitional node may correspond to an animation with dissimilar start and end states such as sleep to rest, stand to sleep, rest to stand, or the like.

Figure 4E:
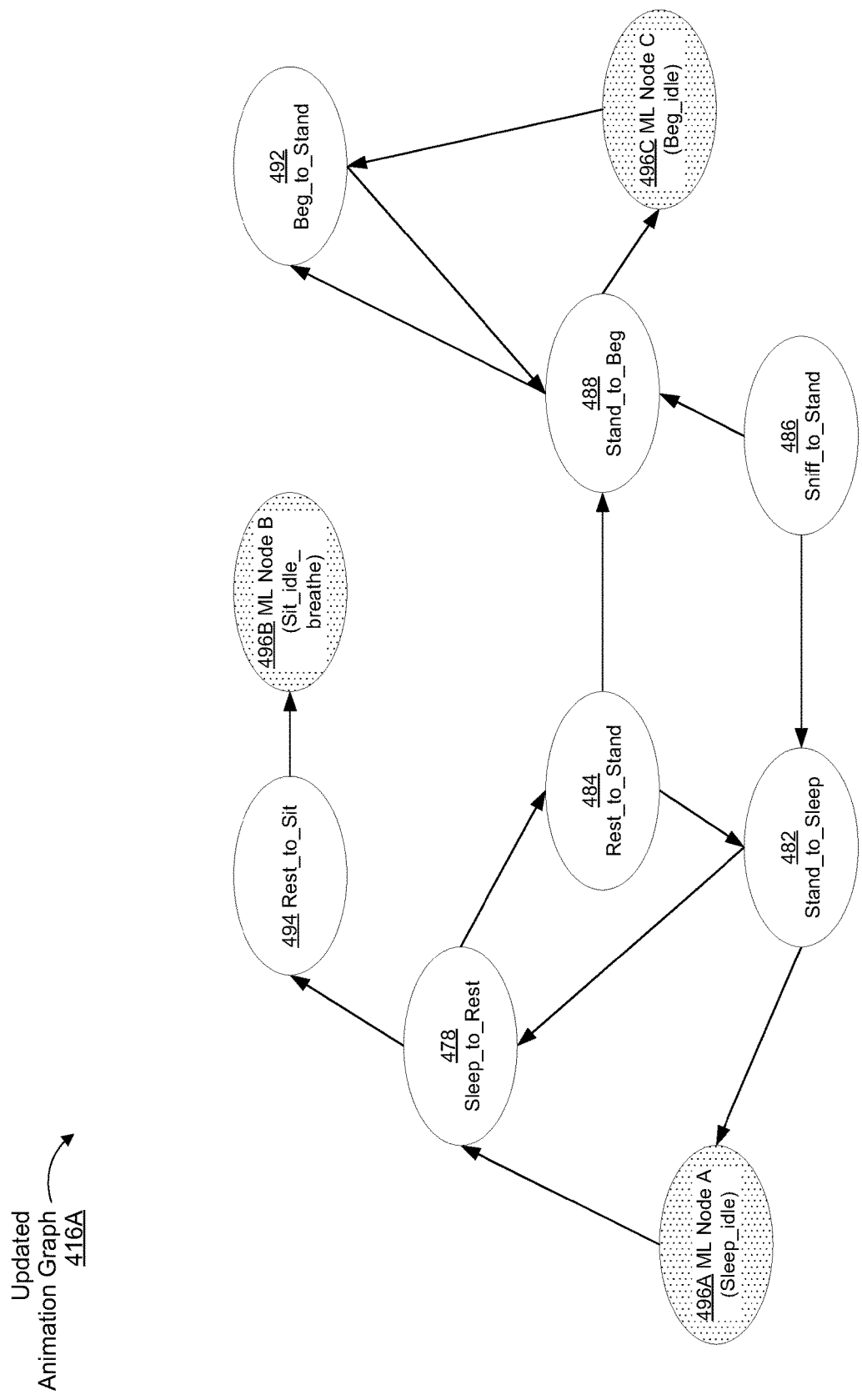
FIGS. 4E and 4F illustrate example updated animation graphs in accordance with some implementations.
Figure 4F:
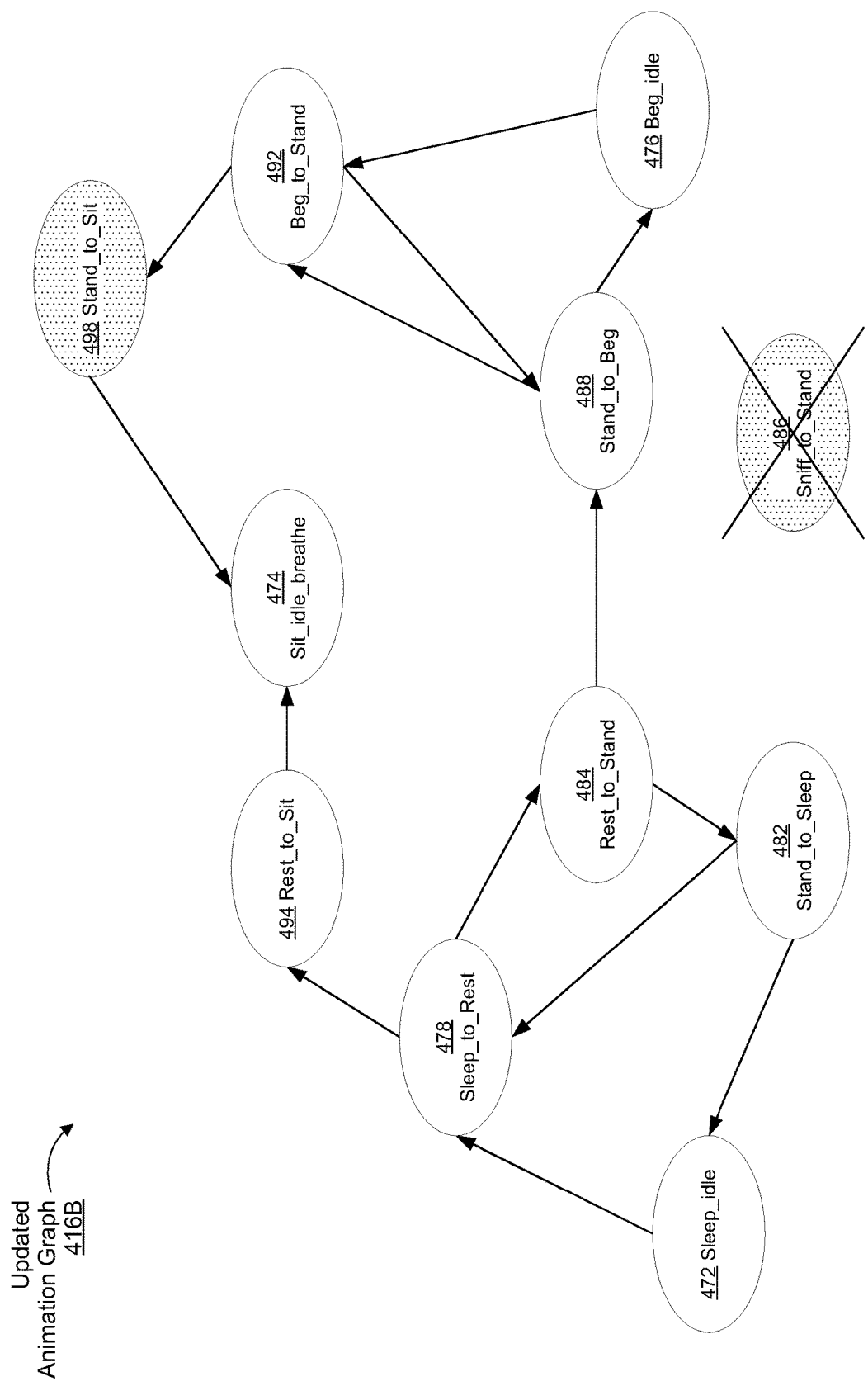

As one example, FIG. 4E illustrates a first updated animation graph 416A whereby the non-transitional nodes 472, 474, and 476 in FIG. 4D have been replaced with ML nodes 496A, 496B, and 496C, respectively. As another example, FIG. 4F illustrates a second updated animation graph 416B whereby a node 498 has been added (e.g., associated with a stand to sit transitional animation) and the node 486 has been removed.

Figure 5:
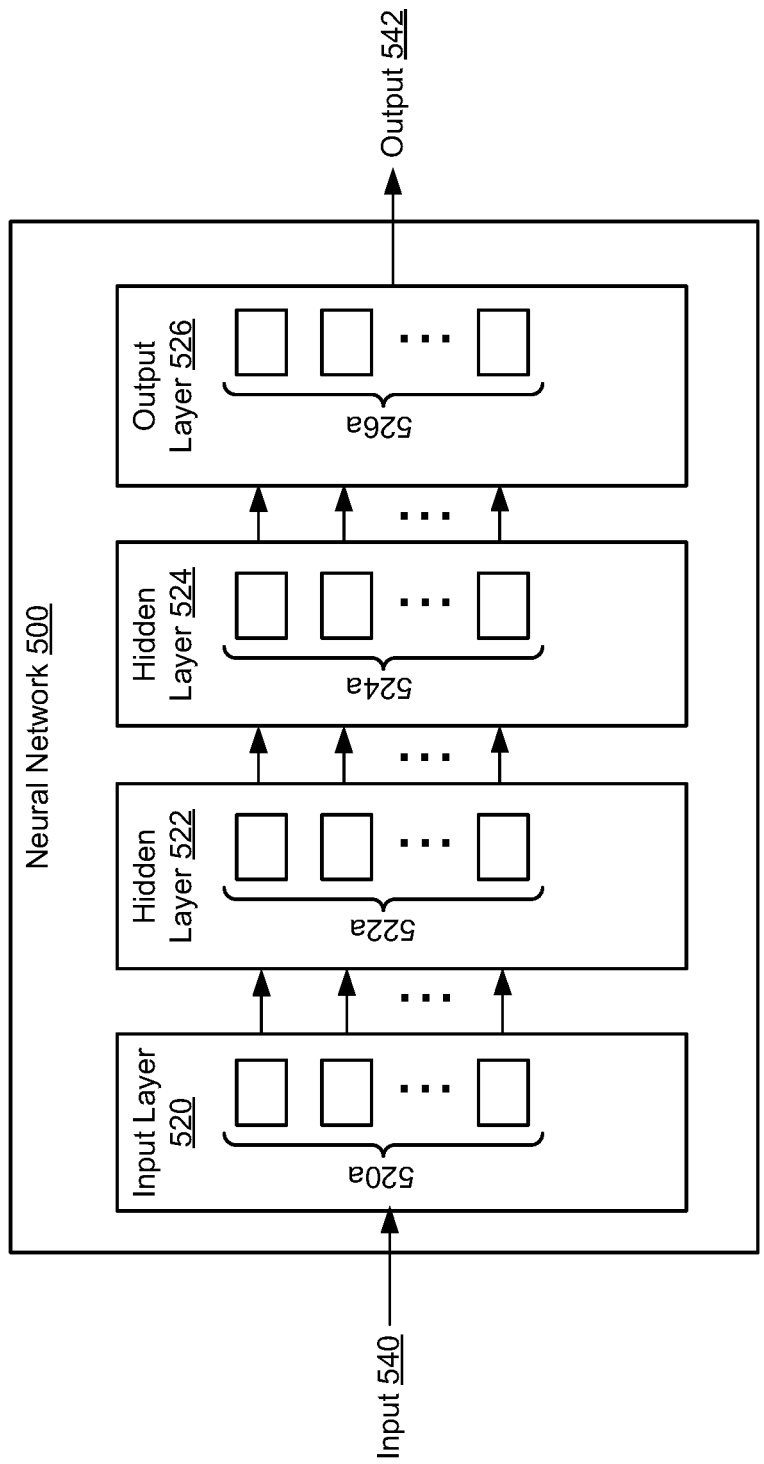
FIG. 5 is a block diagram of an example neural network in accordance with some implementations.

FIG. 5 is a block diagram of an example neural network 500 according to some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the neural network 500 may correspond to the ML nodes 496A, 496B, or 496C in FIG. 4E. To that end, as a non-limiting example, in some implementations, the neural network 500 includes an input layer 520, a first hidden layer 522, a second hidden layer 524, and an output layer 526. While the neural network 500 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

In various implementations, the input layer 520 is coupled (e.g., configured) to receive an input 540. For example, the input 540 corresponds to motion state information. In various implementations, the input layer 520 includes a number of long short-term memory (LSTM) logic units 520a or the like, which are also referred to as model(s) of neurons by those of ordinary skill in the art. In some such implementations, an input matrix from the features to the LSTM logic units 520a include rectangular matrices. For example, the size of this matrix is a function of the number of features included in the feature stream.

In some implementations, the first hidden layer 522 includes a number of LSTM logic units 522a or the like. As illustrated in the example of FIG. 5, the first hidden layer 522 receives its inputs from the input layer 520. For example, the first hidden layer 522 performs one or more of the following: a convolutional operation, a nonlinearity operation, a normalization operation, a pooling operation, and/or the like.

In some implementations, the second hidden layer 524 includes a number of LSTM logic units 524a or the like. In some implementations, the number of LSTM logic units 524a is the same as or similar to the number of LSTM logic units 520a in the input layer 520 or the number of LSTM logic units 522a in the first hidden layer 522. As illustrated in the example of FIG. 5, the second hidden layer 524 receives its inputs from the first hidden layer 522. Additionally, and/or alternatively, in some implementations, the second hidden layer 524 receives its inputs from the input layer 520. For example, the second hidden layer 524 performs one or more of the following: a convolutional operation, a nonlinearity operation, a normalization operation, a pooling operation, and/or the like.

In some implementations, the output layer 526 includes a number of LSTM logic units 526a or the like. In some implementations, the number of LSTM logic units 526a is the same as or similar to the number of LSTM logic units 520a in the input layer 520, the number of LSTM logic units 522a in the first hidden layer 522, or the number of LSTM logic units 524a in the second hidden layer 524. In some implementations, the output layer 526 is a task-dependent layer that performs motion related tasks. In some implementations, the output layer 526 includes an implementation of a multinomial logistic function (e.g., a soft-max function) that produces an output 542. For example, output 542 corresponds to a motion output or an animation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Figure 6A:
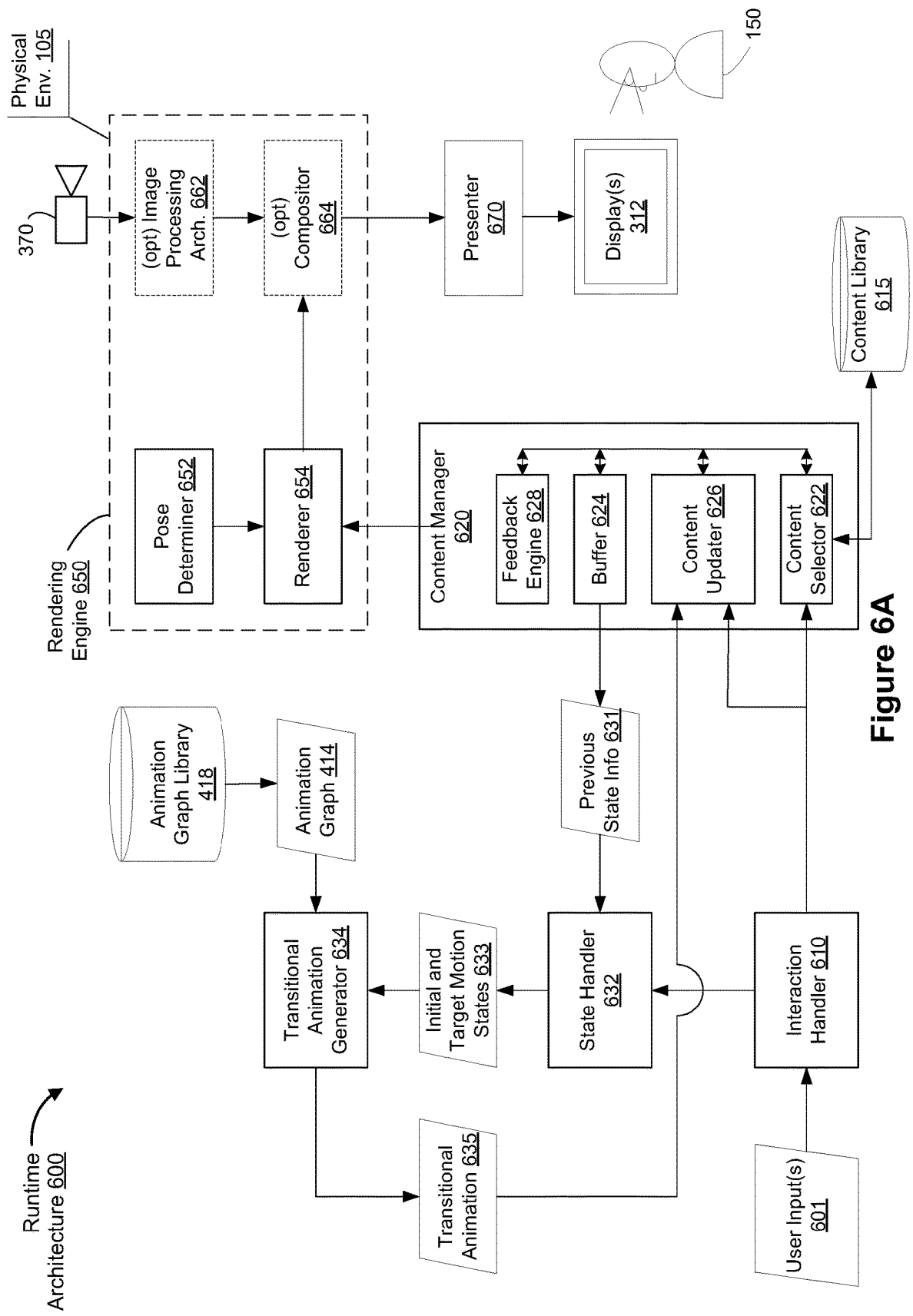
FIG. 6A is a block diagram of an example runtime architecture in accordance with some implementations.

FIG. 6A is a block diagram of an example runtime architecture 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content runtime architecture 600 is included in a computing system such as the controller 110 shown in FIGS. 1 and 2; the electronic device 120 shown in FIGS. 1 and 3; and/or a suitable combination thereof. In some implementations, the runtime architecture 600 includes software, firmware, hardware, an application-specific integrated circuit (ASIC), a field-programmable gate array (FPGA), and/or the like.

As shown in FIG. 6A, the interaction handler 610 obtains (e.g., receives, retrieves, or detects) one or more user inputs 601 provided by the user 150 that are associated with selecting A/V content, XR content, VA(s), and/or the like for presentation. For example, the one or more user inputs 601 correspond to a gestural input selecting XR content from a UI menu detected via hand tracking, an eye gaze input selecting XR content from the UI menu detected via eye tracking, a voice command selecting XR content from the UI menu detected via a microphone, and/or the like. In some implementations, the content selector 622 selects XR content from the content library 615 based on one or more user inputs 601 (e.g., a voice command, a selection from a menu of XR content items, and/or the like). For example, the XR content corresponds to a virtual agent, an XR object, or the like within the XR environment that is animatable or otherwise enabled to translate and/or rotate.

As shown in FIG. 6A, the interaction handler 610 obtains (e.g., receives, retrieves, or detects) one or more user inputs 601 provided by the user 150 that are associated with generating a transitional animation including at least one of an initial reference motion state and a target motion state. For example, the one or more user inputs 601 correspond to one of a touch input, a speech input, a hand tracking input, an eye tracking input, a gestural input, and/or the like.

As shown in FIG. 6A, the state handler 632 ingests: the one or more user inputs 601 provided by the user 150 that are associated with generating a new transitional animation including at least one of the initial reference motion state and the target motion state; and previous state information 631 from the buffer 624. For example, the previous state information 631 corresponds to pose values (e.g., positional and rotational information) associated with a VA for a past instance or frame, pose values (e.g., positional and rotational information) associated with individual joints or sections of the VA for the past instance or frame, contextual information associated with the VA for the past instance or frame, environmental information associated with the XR environment for the past instance or frame, and/or the like. As one example, the state handler 632 obtains the initial reference motion state for the new transitional animation from the previous state information 631 and obtains the target motion state for the new transitional animation from the one or more user inputs 601. In various implementations, the state handler 632 generates the initial and target motion states 633 for the new transitional animation.

As shown in FIG. 6A, the transitional animation generator 634 ingests the animation graph 414 from the animation graph library 418 and the initial and target motion states 633 for the new transitional animation. In FIG. 6A, the transitional animation generator 634 generates a transitional animation 635 (or a motion output associated therewith) based on the animation graph 414 and the initial and target motion states 633. In various implementations, the transitional animation generator 634 determines one or more candidate paths through the animation graph 414 based on the initial and target motion states 633, selects a respective candidate path from among the one or more candidate paths, and generates a motion output based on the respective candidate path that corresponds to the transitional animation 635. For example, the respective candidate path is selected from among the one or more candidate paths based on user preferences, usage history, contextual information, a preference for the least number of edges, a preference for the least complex transitional animation, a preference for the least computationally intensive transitional animation, and/or the like.

Figure 6B:
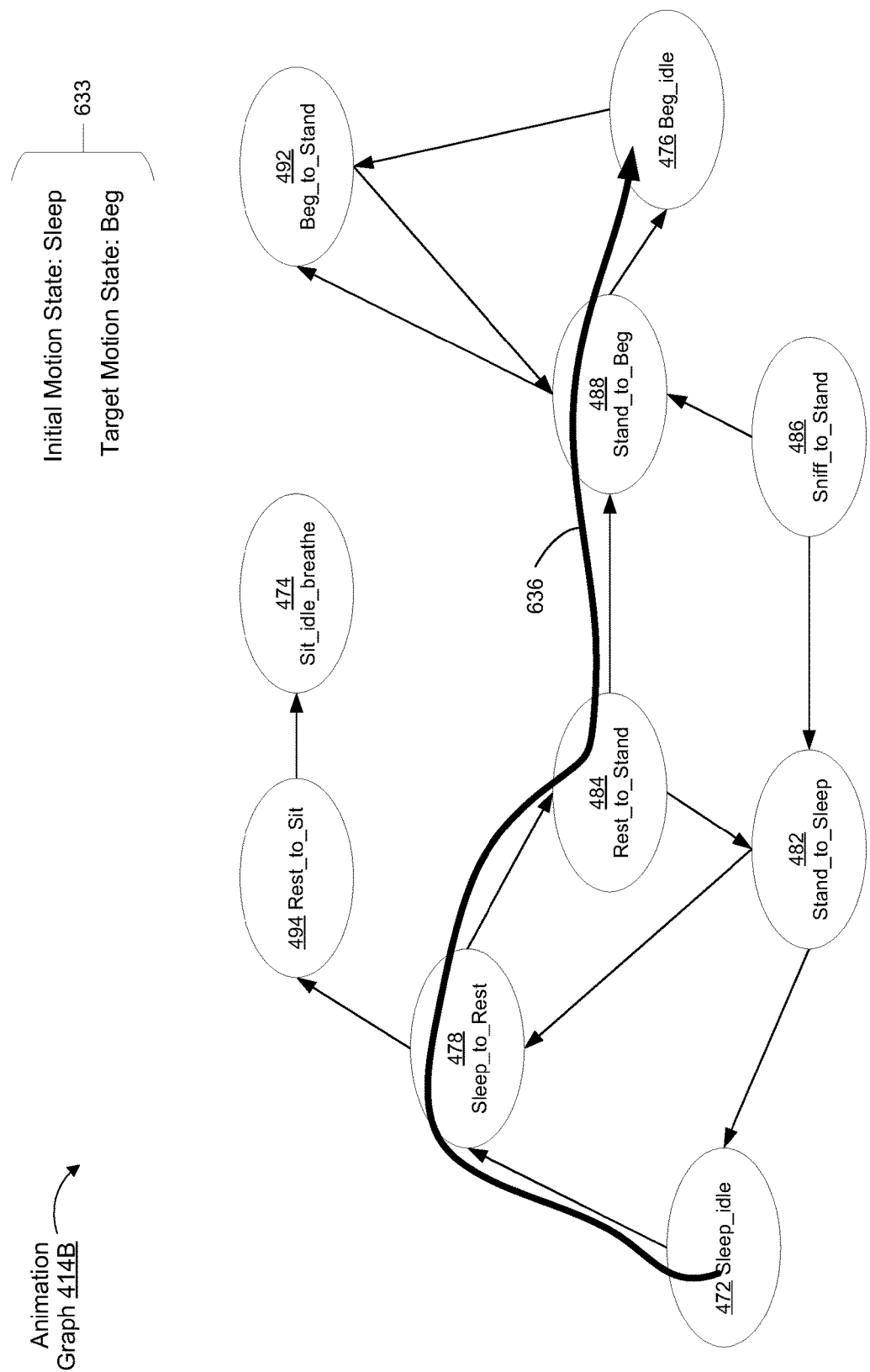
FIG. 6B illustrates an example path for a transitional animation that traverses the animation graph shown in FIG. 4D in accordance with some implementations.

As shown in FIG. 6B, the transitional animation generator 634 identifies a path 636 that traverses the animation graph 414B and includes an initial reference motion state associated with the "sleep" value and a target motion state associated with the "beg" value. In this example, the path 636 starts at the node 472 associated with the sleep idle animation 442 (e.g., including the "fromGait" value associated with the "sleep" motion state). Continuing with this example, the path 636 continues through the nodes 478, 484, and 488. Continuing with this example, the path 636 ends at the node 476 associated with the beg idle animation 446 (e.g., including the "toGait" value associated with the "beg" motion state). As such, the path 636 can be used to generate a motion output for a new transitional animation that includes the initial reference motion state associated with the "sleep" value and the target motion state associated with the "beg" value.

In some implementations, the content updater 626 updates the XR environment 128 (and the XR content, VA(s), and/or the like therein) to include the transitional animation 635. Moreover, in some implementations, the content updater 626 modifies the XR environment 128 (and the XR content, VA(s), and/or the like therein) over time based on translational or rotational movement of the electronic device 120 or physical objects within the physical environment 105, the one or more user inputs 601 directed to the XR environment 128 (e.g., hand/extremity tracking inputs associated with interacting with the XR environment 128, eye tracking inputs associated with interacting with the XR environment 128, touch inputs associated with interacting with the XR environment 128, speech inputs associated with interacting with the XR environment 128, manipulation inputs directed to the XR content or VA(s), and/or the like), and/or the like.

According to some implementations, the feedback engine 628 generates sensory feedback (e.g., visual feedback such as text or lighting changes, audio feedback, haptic feedback, etc.) associated with the XR environment 128. According to some implementations, the pose determiner 652 determines a current camera pose of the electronic device 120 and/or the user 150 relative to the XR environment 128 and/or the physical environment 105. In some implementations, the renderer 654 renders the XR content, VA(s), and/or the like performing the transitional animation 635 according to the current camera pose relative thereto.

According to some implementations, the optional image processing architecture 662 obtains an image stream from an image capture device 370 including one or more images of the physical environment 105 from the current camera pose of the electronic device 120 and/or the user 150. In some implementations, the image processing architecture 662 also performs one or more image processing operations on the image stream such as warping, color correction, gamma correction, sharpening, noise reduction, white balance, and/or the like. In some implementations, the optional compositor 664 composites the rendered XR content with the processed image stream of the physical environment 105 from the image processing architecture 662 to produce rendered image frames of the XR environment. In various implementations, the presenter 670 presents the rendered image frames of the XR environment to the user 150 (e.g., via the one or more displays 312 of the electronic device 120). One of ordinary skill in the art will appreciate that the optional image processing architecture 662 and the optional compositor 664 may not be applicable for fully virtual environments (or optical see-through scenarios).

Figure 7:
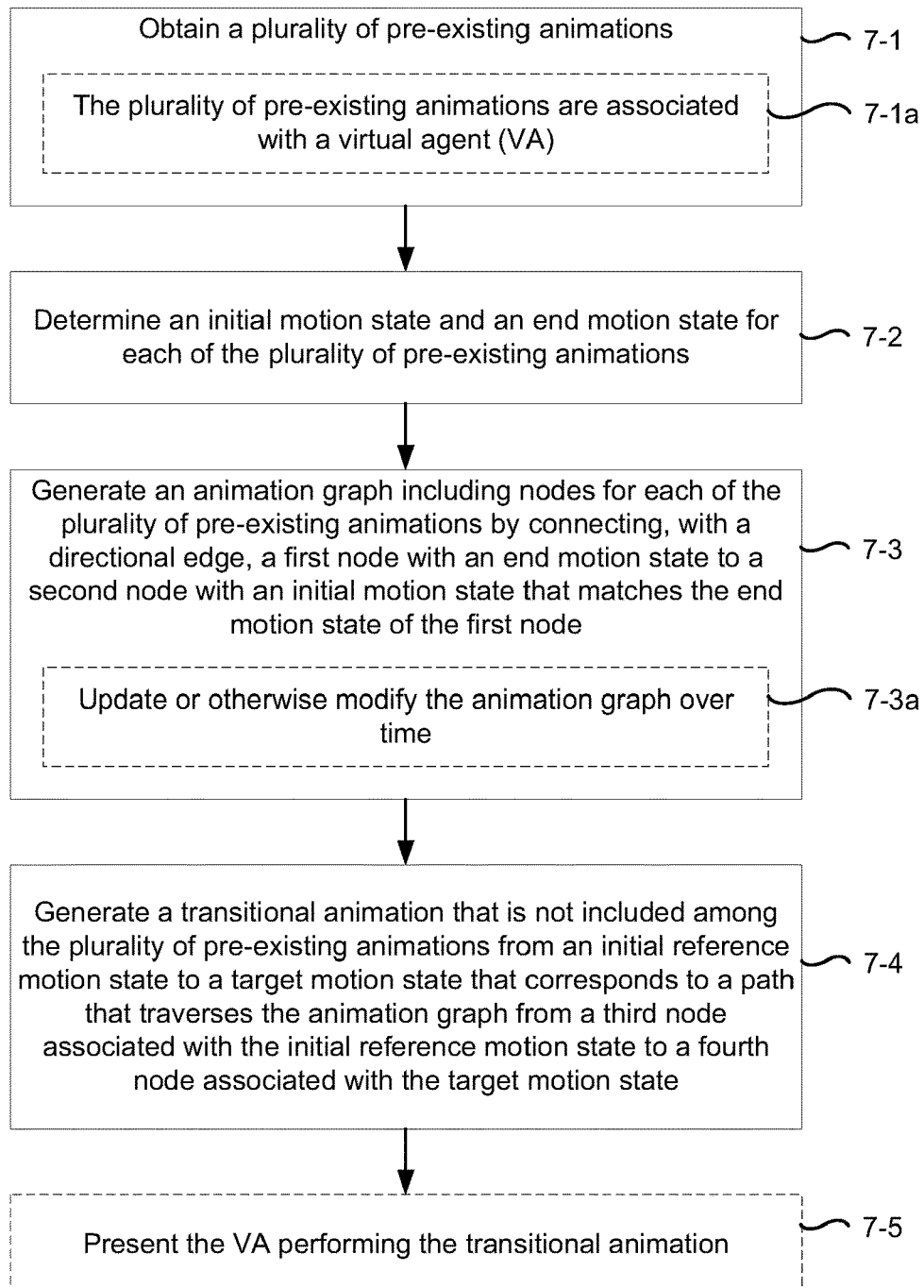
FIG. 7 is a flowchart representation of a method of generating and utilizing an animation graph in accordance with some implementations.

FIG. 7 is a flowchart representation of a method 700 of generating and utilizing an animation graph in accordance with some implementations. In various implementations, the method 700 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the computing system includes the animation graph generation architecture 400 in FIG. 4A and/or the runtime architecture 600 in FIG. 6A. In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, given a library of hand-crafted animations for a virtual agent (VA) or character (e.g., a robot dog), a motion output system may not be able to provide a transition from a current/initial state (e.g., sleeping, sitting, walking, idle, etc.) to a target state (e.g., barking, sniffing, eating, etc.) unless such a transition is included in the library of hand-crafted animations. Thus, according to some implementations, the innovation described herein generates an animation graph based on the library of hand-crafted animations where each node corresponds to a hand-crafted animation and nodes are connected with directional edges where the end state of a first node matches the initial state of a second node. Thereafter, the animation graph may be used to generate transitions between motion states that were not included in the library of hand-crafted animations for the VA. As such, this innovation generates an editable animation graph based on a library of hand-crafted animations for a VA that serves as an input for generating subsequent motion outputs that are not included in the library of hand-crafted animations.

As represented by block 7-1, the method 700 includes obtaining a plurality of pre-existing animations. With reference to FIG. 4A, the animation graph generation architecture 400 or a component thereof (e.g., the animation analyzer 422) obtains a plurality of animations 411 from the animation library 410. For example, the animation library 410 includes a plurality of pre-existing animations associated with a specific domain, character, virtual agent (VA), or the like. As another example, the animation library 410 includes a plurality of sets of pre-existing animations, where each set of pre-existing animations is associated with a specific domain, character, virtual agent (VA), or the like. As one example, the plurality of animations 411 correspond to pre-existing animations associated with a dog-like VA such as sit, stand, beg, bark, sniff, sleep, rollover, etc. animations. In this example, the plurality of animations 411 may have been hand-crafted or manually authored for the dog-like VA.

As noted above, in some implementations, the plurality of pre-existing animations is associated with a virtual agent (VA). For example, the VA corresponds to a humanoid character, an animal character, a vehicle, a robot, or the like.

As shown in FIG. 4B, the animation library 410 includes a sleep idle animation 442, a sit idle (breathe) animation 444, a beg idle animation 446, a sleep to rest transitional animation 448, a stand to sleep transitional animation 452, a rest to stand transitional animation 454, a sniff to stand transitional animation 456, a stand to beg transitional animation 458, a beg to stand transitional animation 462, and a rest to sit transitional animation 464. One of ordinary skill in the art will appreciate that the aforementioned animations within the animation library 410 are merely example animations associated with a dog-like VA that may be modified, replaced, removed, added to, or the like in various other implementations.

As represented by block 7-2, the method 700 includes determining an initial motion state and an end motion state for each of the plurality of pre-existing animations. With reference to FIG. 4A, the animation graph generation architecture 400 or a component thereof (e.g., the animation analyzer 422) obtains (e.g., receives, retrieves, determines generates, etc.) labels and metadata 412 for the plurality of animations 411. As one example, initial and end motion states for a dog-like VA may include one of: sleeping, resting, standing, begging, sniffing, rolling over, eating, walking, or the like. In some implementations, some of the nodes are transitional (e.g., sit-to-stand) and some of the nodes are non-transitional (e.g., sit idle).

As shown in FIG. 4B, each of the animations 442, 444, 446, 448, 452, 454, 456, 458, 462, and 464 in the animation library 410 is associated with metadata information 443, 445, 447, 449, 453, 455, 457, 459, 463, and 465, respectively. In FIG. 4B, the metadata information 443, 445, 447, 449, 453, 455, 457, 459, 463, and 465 each include a "unique ID" value (e.g., a sequence or serial number), a "fromGait" value (e.g., an initial motion state), a "toGait" value (e.g., an end motion state), and an "isTransition" value (e.g., a true or false flag). For example, the labels and metadata 412 generated by the animation analyzer 422 correspond to the metadata information 443, 445, 447, 449, 453, 455, 457, 459, 463, and 465.

As represented by block 7-3, the method 700 includes generating an animation graph including nodes for each of the plurality of pre-existing animations by connecting, with a directional edge, a first node with an end motion state to a second node with an initial motion state that matches the end motion state of the first node. With reference to FIG. 4A, the animation graph generation architecture 400 or a component thereof (e.g., the animation graph generator 424) generates an animation graph 414 based on the plurality of animations 411 from the animation library 410 and the labels and metadata 412.

FIG. 4C illustrates an intermediate state for the animation graph 414A whereby the animations 442, 444, 446, 448, 452, 454, 456, 458, 462, and 464 are associated with nodes 472, 474, 476, 478, 482, 484, 486, 488, 492, and 494, respectively. FIG. 4D illustrates the animation graph 414B whereby the nodes 472, 474, 476, 478, 482, 484, 486, 488, 492, and 494 are connected with directed edges when an end motion state of a first node matches an initial motion state of a second node. As one example, the node 478 (e.g., associated with the sleep to rest transitional animation 448) with a "rest" end motion state value is connected to the node 484 (e.g., associated with the rest to stand transitional animation 454) with a "rest" initial motion state value via a directional edge that proceeds from the node 478 to the node 484.

According to some implementations, the method 700 includes generating a motion graph by encoding the plurality of plurality of pre-existing animations according to one or more embedding space parameters, wherein the animation graph is generated by connecting, with the directional edge, the first node with the end motion state to the second node with the initial motion state that matches the end motion state of the first node based on the motion graph. For example, with reference to FIG. 8A, the motion graph generator 820 obtains (e.g., receives, retrieves, determines, generates, etc.) the motion graph based on source content associated with an asset (e.g., the plurality of pre-existing animations 411 shown in FIG. 4A). Continuing with this example, with reference to FIG. 4A, the animation graph generator 424 generates the animation graph based at least in part on the motion graph.

In some implementations, as represented in block 7-3a, the method 700 includes updating or otherwise modifying the animation graph over time. With reference to FIG. 4A, the animation graph generation architecture 400 or a component thereof (e.g., the animation graph updater 430) updates or otherwise modifies the animation graph 414 over time based on a user request/command, a change in context, user preferences, usage history, etc. to generate an updated animation graph 416. In some implementations, the animation graph updater 430 stores the updated animation graph 416 in the animation graph library 418. In some implementations, the animation graph updater 430 includes a node/edge adder 432, a node/edge pruner 434, and a machine learning (ML) node inserter 436.

In some implementations, the method 700 includes adding one or more nodes to the animation graph to increase the number of connected nodes and/or to connect unconnected nodes. As one example, FIG. 4F illustrates a second updated animation graph 416B whereby a node 498 has been added (e.g., associated with a stand to sit transitional animation) and the node 486 has been removed. With reference to FIG. 4A, the animation graph generation architecture 400 or a component thereof (e.g., the node/edge adder 432) adds one or more nodes and/or edges to the animation graph 414 to increase the number of connected nodes and/or to connect unconnected nodes.

In some implementations, the method 700 includes removing one or more nodes from the animation graph that are unconnected, least frequently used, unrelated to a current story, or non-preferred by the user. As one example, FIG. 4F illustrates a second updated animation graph 416B whereby a node 498 has been added (e.g., associated with a stand to sit transitional animation) and the node 486 has been removed. With reference to FIG. 4A, the animation graph generation architecture 400 or a component thereof (e.g., the node/edge pruner 434) removes one or more nodes and/or edges from the animation graph 414 that are unconnected, least frequently used, unrelated to a current story, not preferred by the user 150, and/or the like.

In some implementations, the method 700 includes inserting a machine learning (ML) sub-system into the animation graph to generate a non-transitional output motion. For example, the non-transitional output motion corresponds to walking, jumping, sleeping idle, sitting idle, or the like. With reference to FIG. 4A, the animation graph generation architecture 400 or a component thereof (e.g., the ML node inserter 436) inserts an ML sub-system into the animation graph 414 to generate a non-transitional output motion. For example, the non-transitional output motion corresponds to walking, running, jumping, sleeping idle, sitting idle, and/or the like.

In some implementations, the method 700 includes replacing a non-transitional node within the animation graph with a machine learning (ML) sub-system to generate the non-transitional output motion. As one example, FIG. 4E illustrates a first updated animation graph 416A whereby the non-transitional nodes 472, 474, and 476 of FIG. 4D have been replaced with ML nodes 496A, 496B, and 496C, respectively. With reference to FIG. 4A, the animation graph generation architecture 400 or a component thereof (e.g., the ML node inserter 436) replaces a non-transitional node within the animation graph 414 with an ML sub-system to generate the non-transitional output motion. For example, the non-transitional node may correspond to one of walking, running, jumping, sleeping idle, sitting idle, or the like.

In some implementations, the method 700 includes training the ML sub-system by reducing the error value of random walks through the animation graph. For example, the ML sub-system corresponds to ambulation, locomotion, or the like. In some implementations, the ML sub-system corresponds to one of a neural network (NN), a convolutional neural network (CNN), a recurrent neural network (RNN), a deep neural network (DNN), a support-vector machine (SVM), a relevance vector machine (RVM), or a random forest algorithm.

As represented by block 7-4, the method 700 includes generating a transitional animation that is not included among the plurality of pre-existing animations from an initial reference motion state to a target motion state that corresponds to a path that traverses the animation graph from a third node associated with the initial reference motion state to a fourth node associated with the target motion state. With reference to FIG. 6A, the runtime architecture 600 or a component thereof (e.g., the transitional animation generator 634) ingests the animation graph 414 from the animation graph library 418 and the initial and target motion states 633 for the new transitional animation.

With continued reference to FIG. 6A, the runtime architecture 600 or a component thereof (e.g., the transitional animation generator 634) generates a transitional animation 635 (or a motion output associated therewith) based on the animation graph 414 and the initial and target motion states 633. In various implementations, with reference to FIG. 6A, the runtime architecture 600 or a component thereof (e.g., the transitional animation generator 634 determines one or more candidate paths through the animation graph 414 based on the initial and target motion states 633, selects a respective candidate path from among the one or more candidate paths, and generates a motion output based on the respective candidate path that corresponds to the transitional animation 635. For example, the respective candidate path is selected from among the one or more candidate paths based on user preferences, usage history, contextual information, a preference for the least number of edges, a preference for the least complex transitional animation, and/or the like.

As shown in FIG. 6B, the transitional animation generator 634 identifies a path 636 that traverses the animation graph 414B and includes an initial reference motion state associated with the "sleep" value and a target motion state associated with the "beg" value. In this example, the path 636 starts at the node 472 associated with the sleep idle animation 442 (e.g., including the "fromGait" value associated with the "sleep" motion state). Continuing with this example, the path 636 continues through the nodes 478, 484, and 488. Continuing with this example, the path 636 ends at the node 476 associated with the beg idle animation 446 (e.g., including the "toGait" value associated with the "beg" motion state). As such, the path 636 can be used to generate a motion output for a new transitional animation that includes the initial reference motion state associated with the "sleep" value and the target motion state associated with the "beg" value.

In some implementations, as represented by block 7-5, the method 700 includes presenting, via the display device, the VA performing the transitional animation. With reference to FIG. 6A, the runtime architecture 600 or a component thereof (e.g., the content updater 626) updates the XR environment 128 (and the XR content, VA(s), and/or the like therein) to include the transitional animation 635. With further reference to FIG. 6A, the runtime architecture 600 or a component thereof (e.g., the pose determiner 652) determines a current camera pose of the electronic device 120 and/or the user 150 relative to the XR environment 128 and/or the physical environment 105. According to some implementations, the pose determiner 652 updates the current camera pose in response to detecting translational and/or rotational movement of the electronic device 120 and/or the user 150. With continued reference to FIG. 6A, the runtime architecture 600 or a component thereof (e.g., the renderer 654) renders the XR content, VA(s), and/or the like performing the transitional animation (or a motion output associated therewith) according to the current camera pose relative thereto.

With continued reference to FIG. 6A, the runtime architecture 600 or a component thereof (e.g., the compositor 664) composites the rendered XR content, VA(s), and/or the like performing the transitional animation with the processed image stream of the physical environment 105 from the image processing architecture 662 to produce rendered image frames of the XR environment. In various implementations, the presenter 670 presents the rendered image frames of the XR environment to the user 150 (e.g., via the one or more displays 312 of the electronic device 120). One of ordinary skill in the art will appreciate that the optional image processing architecture 662 and the optional compositor 664 may not be applicable for fully virtual environments (or optical see-through scenarios).

In some implementations, the display device corresponds to a transparent lens assembly, and wherein the VA is projected onto the transparent lens assembly. In some implementations, the display device corresponds to a near-eye system, and wherein presenting the VA includes compositing the VA with one or more images of a physical environment captured by an exterior-facing image sensor.

In some implementations, the method 700 includes obtaining an initial reference motion state and a target motion state; determining one or more candidate paths through the animation graph based on the initial reference motion state and the target motion state; selecting a respective candidate path from among the one or more candidate paths; generating a motion output based on the respective candidate path; and presenting, via the display device, the VA performing the motion output. In some implementations, the respective candidate path is selected from among the one or more candidate paths based on selection criteria/logic such as limiting the number of sequential motion states, user preferred motion states, smooth sequence of motion states, lifelike sequence of motion states, and/or the like.

In some implementations, the output motion corresponds to a sequence of two or more actions or motions states. For example, given that the initial motion state corresponds to walking and the target motion state corresponds to rolling over, the output motion may include the following sequence of motion states: walking to sitting to lying down to rolling over. In some implementations, the output motion uses a local coordinate system when blending the sequence of two or more actions or motions states in order to reduce jitter and improve the smoothness of the output motion. In some implementations, the output motion uses a local coordinate system when interpolating between glyphs associated with the sequence of two or more actions or motions states in order to reduce jitter and improve the smoothness of the output motion.

Figure 8A:
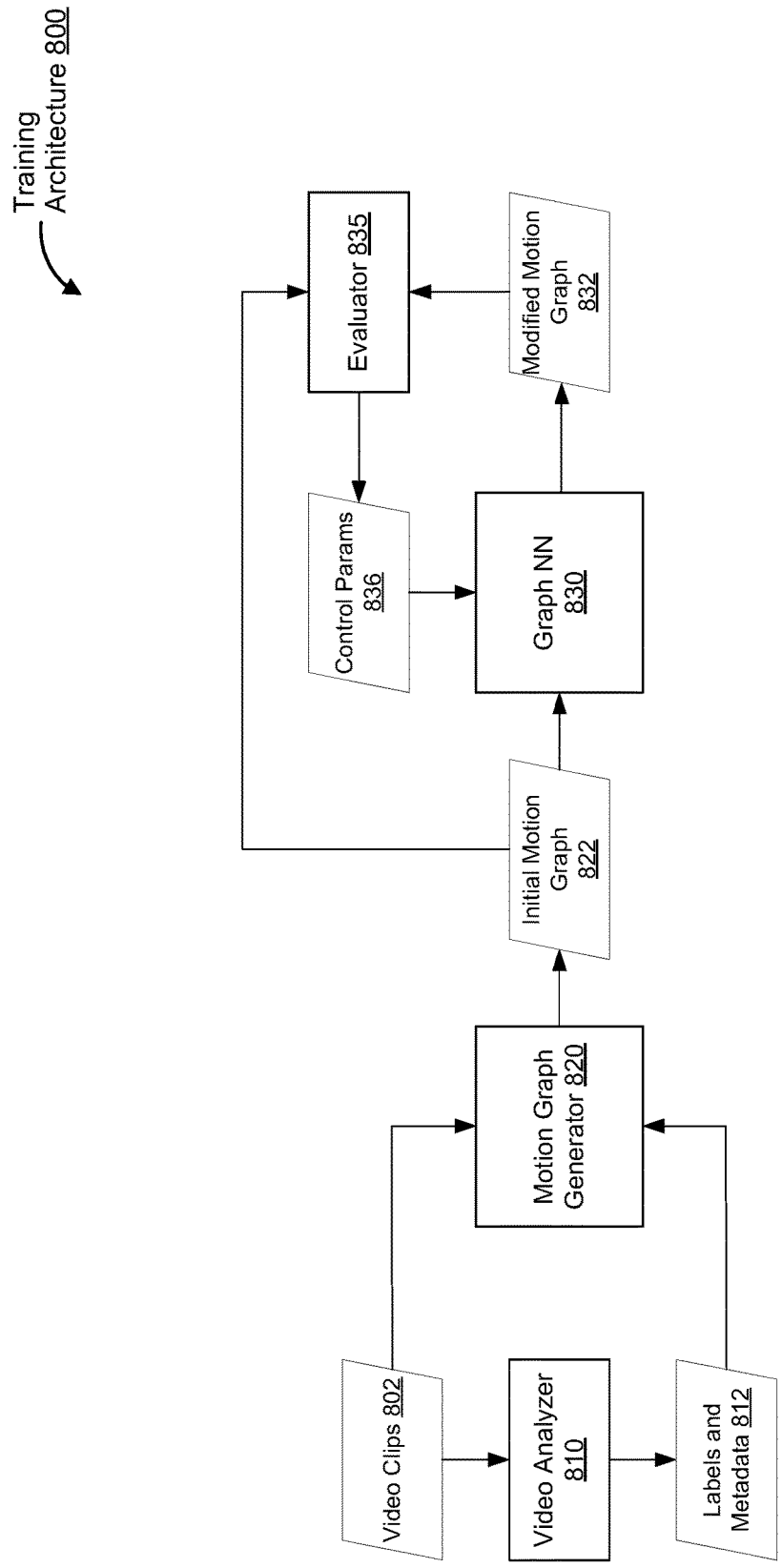
FIG. 8A is a block diagram of an example training architecture in accordance with some implementations.

FIG. 8A is a block diagram of an example training architecture 800 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the training architecture 800 is included in a computing system such as the controller 110 shown in FIGS. 1 and 2; the electronic device 120 shown in FIGS. 1 and 3; and/or a suitable combination thereof. In some implementations, the training architecture 800 includes software, firmware, hardware, an application-specific integrated circuit (ASIC), a field-programmable gate array (FPGA), and/or the like. According to some implementations, the training architecture 800 replaces or complements at least a portion of the animation graph generation architecture 400 in FIGS. 2 and 4A.

As shown in FIG. 8A, a video analyzer 810 ingests a plurality of video clips 802 (e.g., from a local or remote storage location) and obtains (e.g., receives, retrieves, determines, generates, etc.) labels and metadata 812 for the plurality of video clips 802. For example, the labels and metadata 812 characterize an asset (e.g., an animal, a vehicle, a robot, a human, etc.) and metadata associated therewith (e.g., height, weight, speed, dimensions, etc.), an asset pose and metadata associated therewith (e.g., sleeping, laying, sitting, standing, walking, running, etc.), an action performed by the asset and metadata associated therewith (e.g., pick up an item, roll over, scratch, etc.), and/or the like.

Figure 8B:
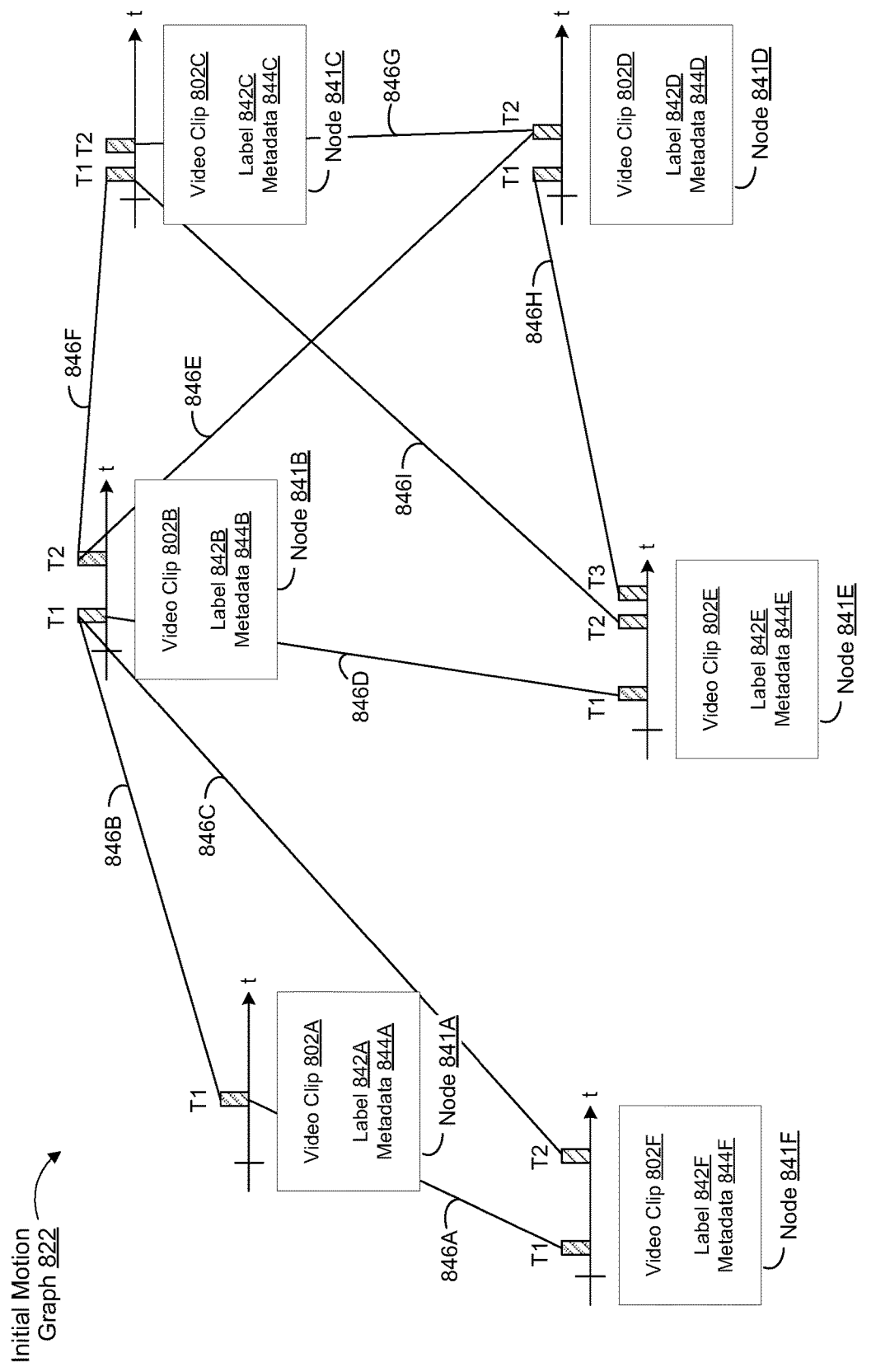
FIG. 8B shows an example of an initial motion graph according to some implementations.

As shown in FIG. 8A, a motion graph generator 820 obtains (e.g., receives, retrieves, determines, generates, etc.) an initial motion graph 822 based on the labels and metadata 812 and the plurality of video clips 802 associated therewith. FIG. 8B shows an example of the initial motion graph 822 according to some implementations. For example, the plurality of video clips 802 at least includes video clips 802A, 802B, 802C, 802D, 802E, and 802F. As shown in FIG. 8B, the video clips 802A, 802B, 802C, 802D, 802E, and 802F are associated with nodes 841A, 841B, 841C, 841D, 841E, and 841F, respectively, (sometimes referred to collectively herein as "the nodes 841") within the initial motion graph 822. Furthermore, as shown in FIG. 8B, each of the nodes 841 includes one of the labels 842A-F and metadata 844A-F for the associated video clip. For example, the node 841B for the video clip 802B includes a label 842B and metadata 844B. According to some implementations, the initial motion graph 822 connects video clips at specific times or time intervals, which are suitable transition points between the connected video clips based on similar states, actors, actor poses, actions, and/or the like.

As shown in FIG. 8B, the initial motion graph 822 further includes edges 846A-I connecting the nodes 841 when a state for one node matches a state for another node. In one example, an edge 846A connects nodes 841F and 841A.

More specially, in this example, the state at T1 within the video clip 802F associated with node 841F matches the state at T1 within the video clip 802A associated with node 841A. In another example, an edge 846B connects nodes 841A and 841B, where the state at T1 within the video clip 802A associated with the node 841A matches the state at T1 within the video clip 802B associated with node 841B.

In yet another example, an edge 846C connects nodes 841B and 841F, where the state at T2 within the video clip 802F associated with the node 841F matches the state at T1 within the video clip 802B associated with node 841B. In yet another example, an edge 846D connects nodes 841B and 841E, where the state at T1 within the video clip 802B associated with the node 841B matches the state at T1 within the video clip 802E associated with node 841E. In yet another example, an edge 846E connects nodes 841B and 841D, where the state at T2 within the video clip 802B associated with the node 841B matches the state at T2 within the video clip 802D associated with node 841D.

In yet another example, an edge 846F connects nodes 841B and 841C, where the state at T2 within the video clip 802B associated with the node 841C matches the state at T1 within the video clip 802C associated with node 841C. In yet another example, an edge 846G connects nodes 841C and 841D, where the state at T2 within the video clip 802C associated with the node 841C matches the state at T2 within the video clip 802D associated with node 841D. In yet another example, an edge 846H connects nodes 841D and 841E, where the state at T1 within the video clip 802D associated with the node 841D matches the state at T3 within the video clip 802E associated with node 841E. In yet another example, an edge 846I connects nodes 841C and 841E, where the state at T1 within the video clip 802C associated with the node 841C matches the state at T2 within the video clip 802E associated with node 841E.

Figure 8C:
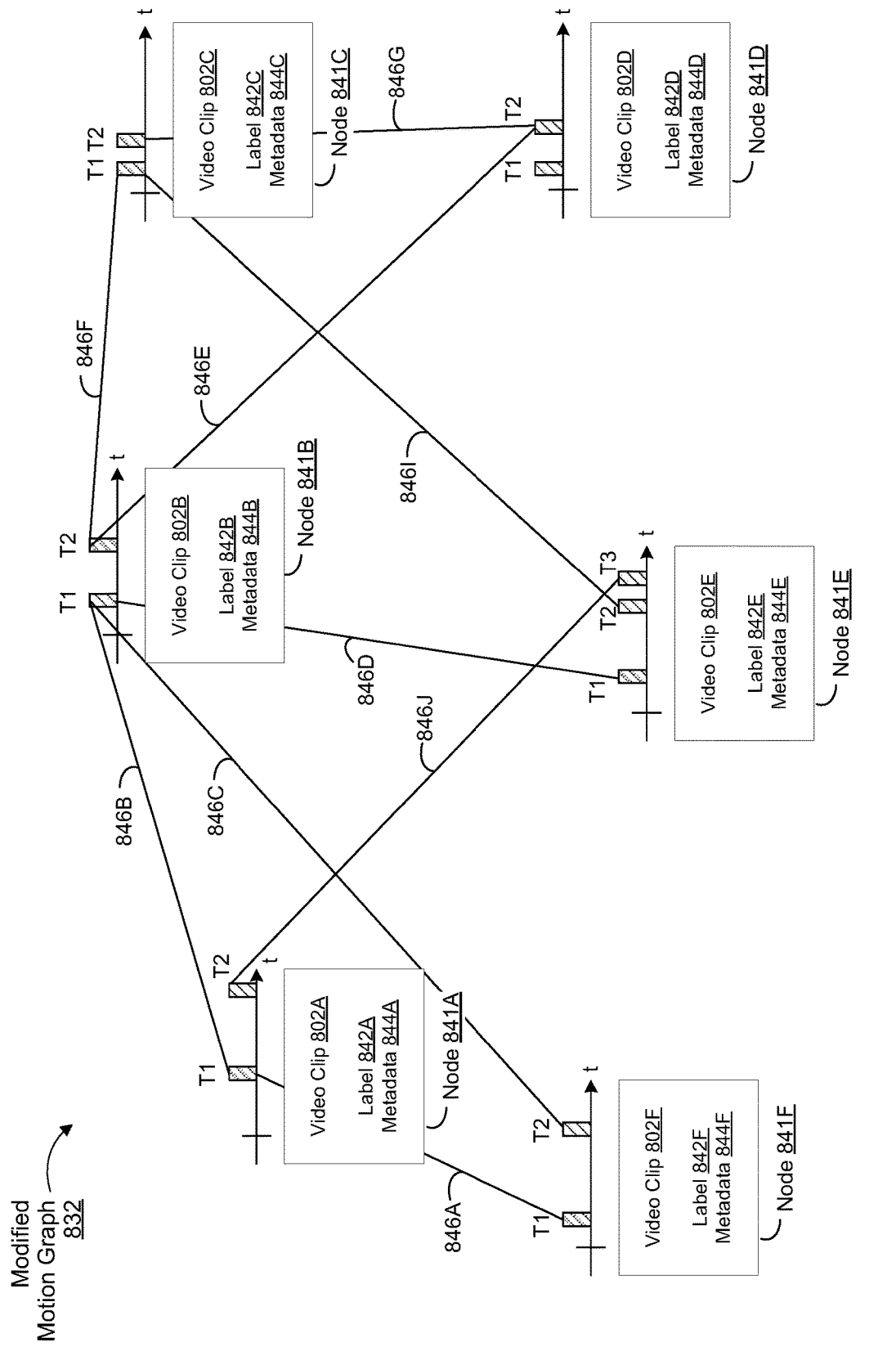
FIG. 8C shows an example of a modified motion graph according to some implementations.

As shown in FIG. 8A, a graph neural network 830 obtains (e.g., receives, retrieves, determines, generates, etc.) a modified motion graph 832 based on the initial motion graph 822. For example, the graph neural network 830 processes the initial motion graph 822, including the nodes 841A-F and the edges 846A-I therebetween, and simulates adding and/or removing edges therewithin to generate a modified motion graph 832. FIG. 8C shows an example of the modified motion graph 832 according to some implementations. Relative to the initial motion graph 822 in FIG. 8B, the edge 846H has been removed and an edge 846J has been added in the modified motion graph 832. In this example, the edge 846J connects nodes 841A and 841E, where the state at T2 within the video clip 802A associated with the node 841A matches the state at T3 within the video clip 802E associated with node 841E.

Continuing with the description of FIG. 8A, the evaluator 835 generates an error value or convergence value for an iteration of a training routine by comparing the initial motion graph 822 to the modified motion graph 832. In accordance with a determination that the error or convergence value does not satisfy (e.g., does not exceed) a threshold training value, the evaluator 835 determines modified values for one or more control parameters 836 of the graph neural network, such as filter weights or the like, based on the error value, implements the modified values for one or more control parameters 836, and proceeds to a subsequent iteration of the training routine. In accordance with a determination that the error or convergence value satisfies (e.g., exceeds) the threshold training value, the training architecture 800 determines that the graph neural network 830 is trained for runtime usage and exits the training routine.

Figure 8D:
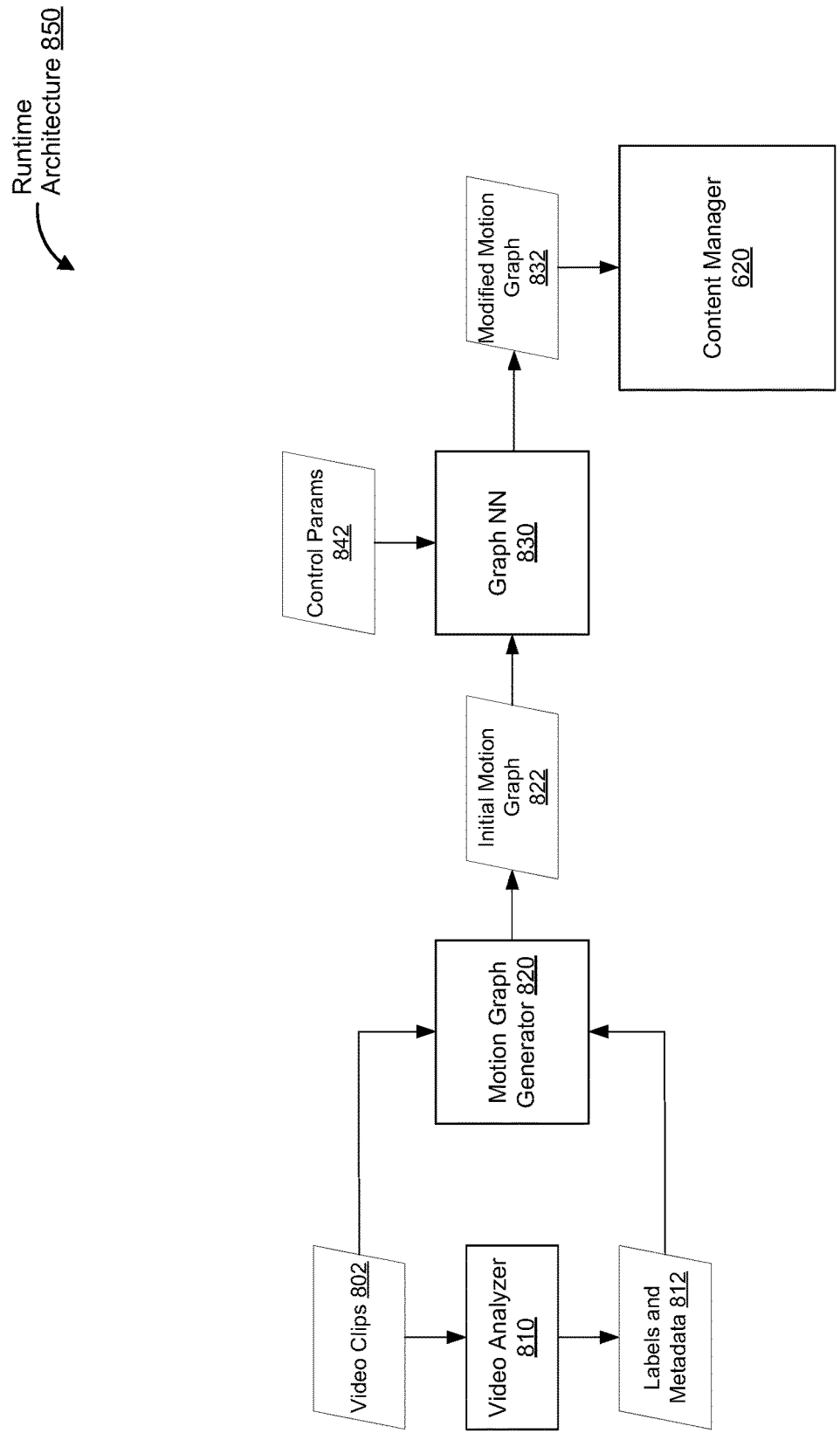
FIG. 8D is a block diagram of an example runtime architecture in accordance with some implementations.

FIG. 8D is a block diagram of an example runtime architecture 850 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the runtime architecture is included in a computing system such as the controller 110 shown in FIGS. 1 and 2; the electronic device 120 shown in FIGS. 1 and 3; and/or a suitable combination thereof. In some implementations, the runtime architecture 850 includes software, firmware, hardware, an application-specific integrated circuit (ASIC), a field-programmable gate array (FPGA), and/or the like. According to some implementations, the runtime architecture 850 replaces or complements at least a portion of the runtime architecture 600 in FIGS. 2 and 6A.

FIG. 8D is similar to and adapted from FIG. 8A. As such, similar references numbers are used in FIGS. 8A and 8D and only the differences will be described for the sake of brevity. In contrast to FIG. 8A, the runtime architecture 850 in FIG. 8D does not include the evaluator 835, and the modified motion graph 832 is provided to the content manager 620 for subsequent rendering by the rendering engine 650 shown in FIG. 6A. According to some implementations, the runtime architecture 850 may adjust one or more control parameters 842 of the graph neural network 830.

Figure 9A:
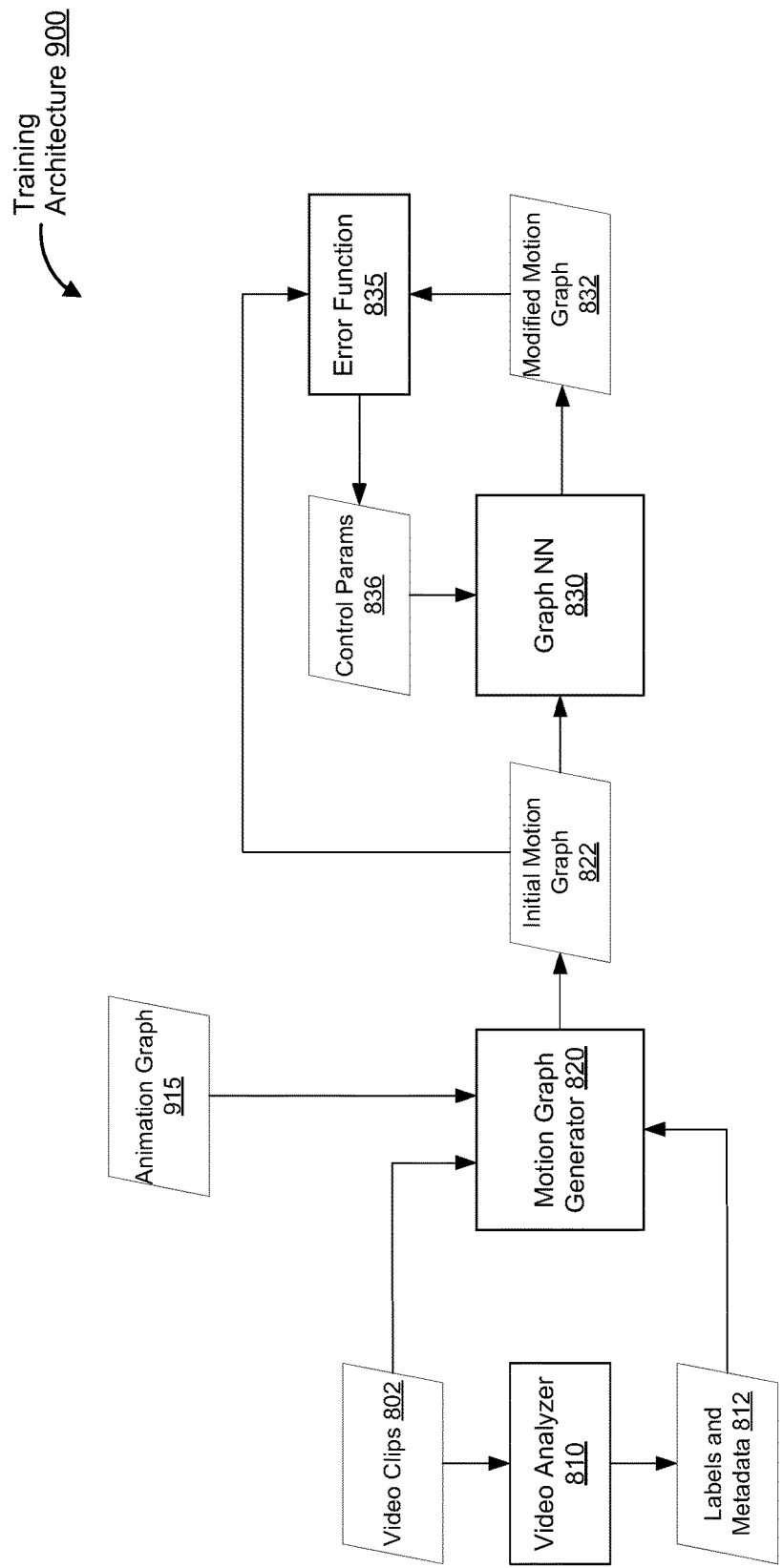
FIG. 9A is a block diagram of another example training architecture in accordance with some implementations.

FIG. 9A is a block diagram of an example training architecture 900 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the training architecture 900 is included in a computing system such as the controller 110 shown in FIGS. 1 and 2; the electronic device 120 shown in FIGS. 1 and 3; and/or a suitable combination thereof. In some implementations, the training architecture 900 includes software, firmware, hardware, an application-specific integrated circuit (ASIC), a field-programmable gate array (FPGA), and/or the like. According to some implementations, the training architecture 900 replaces or complements at least a portion of the animation graph generation architecture 400 in FIGS. 2 and 4A.

FIG. 9A is similar to and adapted from FIG. 8A. As such, similar references numbers are used in FIGS. 8A and 9A and only the differences will be described for the sake of brevity. In contrast to FIG. 8A, the motion graph generator 820 in FIG. 9A obtains (e.g., receives, retrieves, determines, generates, etc.) the initial motion graph 822 based on an animation graph 915, the labels and metadata 812, and the plurality of video clips 802 associated therewith. For example, the animation graph 915 corresponds to a pre-existing animation graph that has been hand-crafted or manually authored for an actor (e.g., a dog-like VA) that is associated with the plurality of video clips 802. In one example, the animation graph 915 corresponds to the animation graph 414B in FIG. 4D.

Figure 9B:
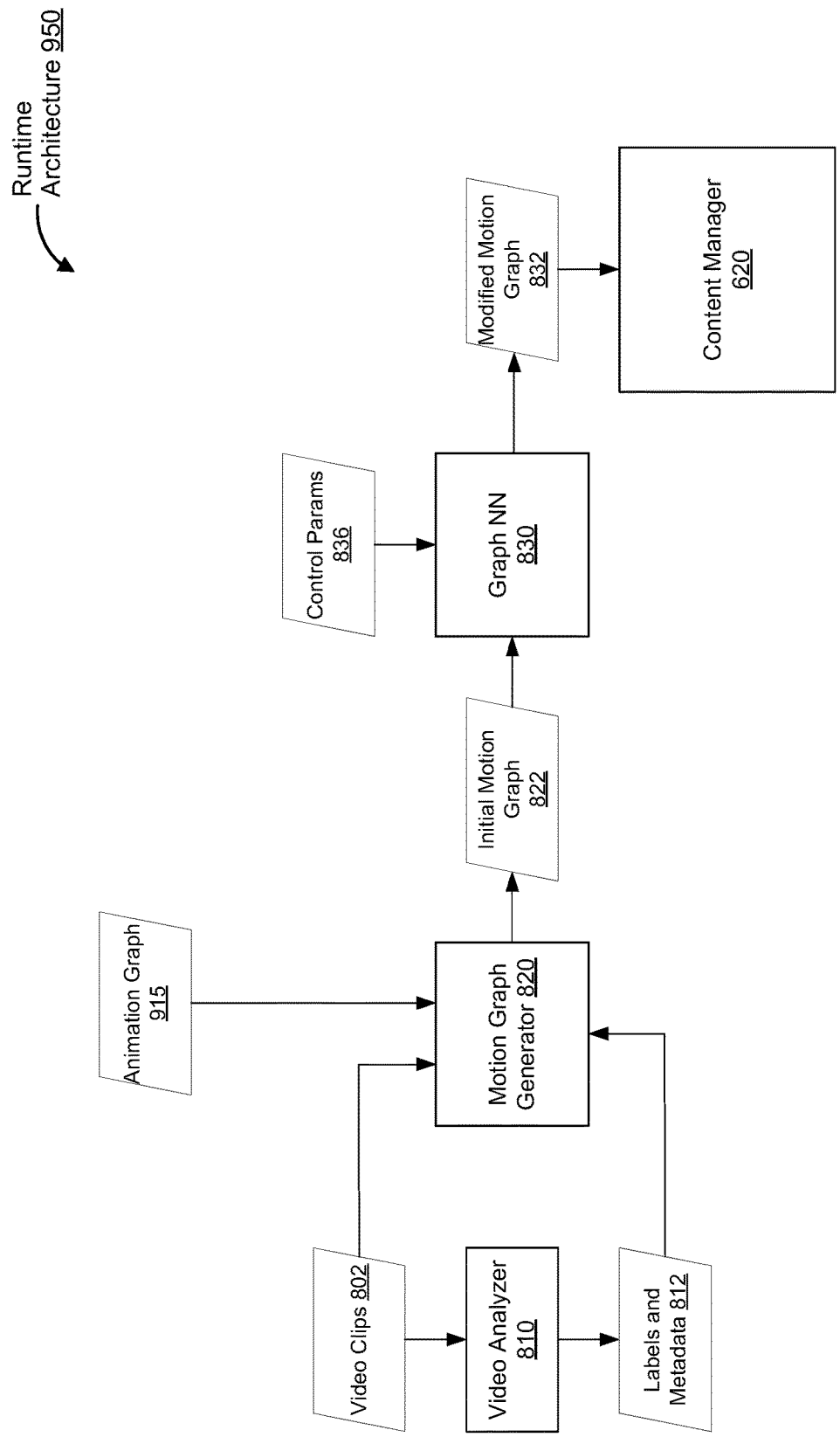
FIG. 9B is a block diagram of another example runtime architecture in accordance with some implementations.

FIG. 9B is a block diagram of an example runtime architecture 950 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the runtime architecture is included in a computing system such as the controller 110 shown in FIGS. 1 and 2; the electronic device 120 shown in FIGS. 1 and 3; and/or a suitable combination thereof. In some implementations, the runtime architecture 950 includes software, firmware, hardware, an application-specific integrated circuit (ASIC), a field-programmable gate array (FPGA), and/or the like. According to some implementations, the runtime architecture 950 replaces or complements at least a portion of the runtime architecture 600 in FIGS. 2 and 6A.

FIG. 9B is similar to and adapted from FIG. 9A. As such, similar references numbers are used in FIGS. 9A and 9B and only the differences will be described for the sake of brevity. In contrast to FIG. 9A, the runtime architecture 950 in FIG. 9B does not include the evaluator 835, and the modified motion graph 832 is provided to the content manager 620 for subsequent rendering by the rendering engine 650 shown in FIG. 6A.

Figure 10:
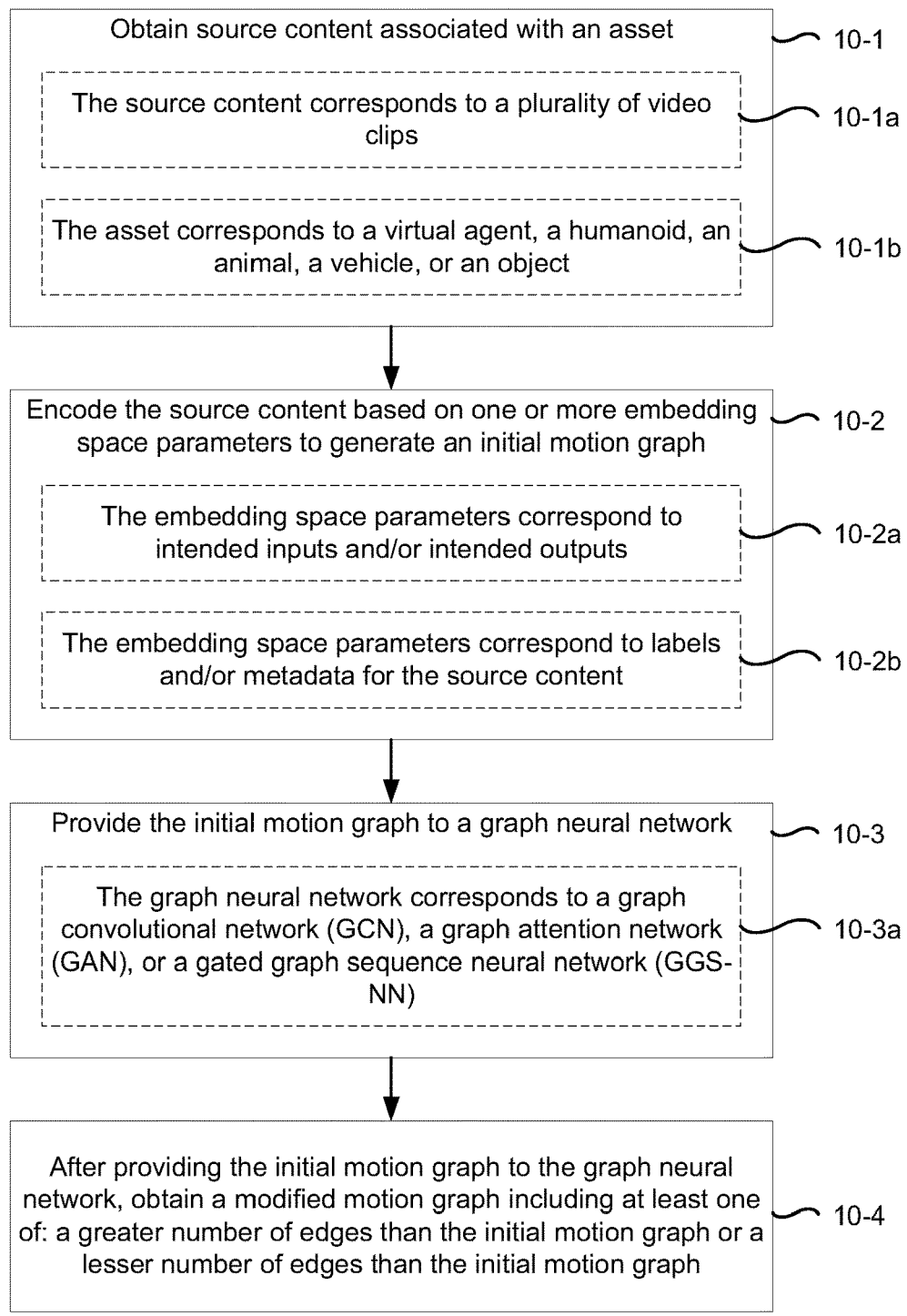
FIG. 10 is a flowchart representation of a method of generating a motion graph in accordance with some implementations.

FIG. 10 is a flowchart representation of a method 1000 of generating a motion graph in accordance with some implementations. In various implementations, the method 1000 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the computing system includes the training architecture 800 in FIG. 8A, the runtime architecture 850 in FIG. 8D, and/or at least a portion of the runtime architecture 600 in FIG. 6A. In some implementations, the computing system includes the training architecture 900 in FIG. 9A, the runtime architecture 950 in FIG. 9D, and/or at least a portion of the runtime architecture 600 in FIG. 6A. In some implementations, the method 1000 is performed by processing logic, including hardware, firmware, software, or a combination thereof. In some implementations, the method 1000 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

Often transitions between animations performed by a virtual agent are jittery, jumpy, or incongruent. Therefore, a graph neural network may be used to generate smooth transitions between primitive actions based on a plurality of video clips and/or an existing animation graph.

As represented by block 10-1, the method 1000 includes obtaining source content associated with an asset. As shown in FIG. 8D, the runtime architecture 850 obtains a plurality of video clips 802 from a local source or a remote source. As shown in FIG. 9B, the runtime architecture 950 obtains a plurality of video clips 802 from a local source or a remote source. In some implementations the source content corresponds to the plurality of animation 411 described above in FIG. 4A.

In some implementations, as represented by block 10-1a, the source content corresponds to a plurality of video clips or the like. For example, the plurality of video clips 802 are obtained (e.g., received, retrieved, captured, or generated) by a non-expert user. Furthermore, the plurality of video clips 802 do not need to be trimmed to start or end at specific poses. Furthermore, the plurality of video clips 802 do not need to be labeled based on specific asset class/type, asset pose, action, etc. In some implementations, as represented by block 10-1b, the asset corresponds to a virtual agent, a humanoid, an animal, a vehicle, an object, or the like.

In some implementations, as shown in FIGS. 8D and 9B, the video analyzer 810 generates labels and metadata 812 for the plurality of video clips 802. For example, the labels and metadata 812 include an asset class/type, asset pose, action, and/or the like for each asset within each of the plurality of video clips 802

According to some implementations, the method 1000 includes: identifying a plurality of asset poses associated with the source content; and labeling the plurality of asset poses associated with the source content. For example, the plurality of asset poses corresponds to sitting, standing, laying, squatting, kneeling, running, walking, and/or the like. In some implementations, the asset poses are dependent on a classification or typification for the asset. For example, asset poses for a humanoid may be different from asset poses for an animal.

According to some implementations, the method 1000 includes: identifying a plurality of actions associated with the source content; and labeling the plurality of actions associated with the source content. For example, the plurality of actions corresponds to talking, picking up an object, scratching, rolling over, begging, ambulating, and/or the like. In some implementations, the actions are dependent on a classification or typification for the asset. For example, actions for a humanoid may be different from actions for an animal.

As represented by block 10-2, the method 1000 includes encoding the source content based on one or more embedding space parameters to generate an initial motion graph. In some implementations, as represented by block 10-2a, the embedding parameters correspond to intended inputs and/or intended outputs associated with the motion graph. In some implementations, as represented by block 10-2b, the embedding parameters correspond to labels and/or metadata for the source content. FIG. 9B, for example, illustrates the initial motion graph 822, which is described in more detail above.

As shown in FIG. 8D, the motion graph generator 820 generates the initial motion graph 822 based on the plurality of video clips 802 and the labels and metadata 812 therefor (e.g., the embedding parameters). As shown in FIG. 9B, the motion graph generator 820 generates the initial motion graph 822 based on the plurality of video clips 802 and the labels and metadata 812 therefor (e.g., the embedding parameters) and also based on an existing animation graph 915. For example, the animation graph 915 corresponds to a pre-existing animation graph that has been hand-crafted or manually authored for an actor (e.g., a dog-like VA) that is associated with the plurality of video clips 802. In one example, the animation graph 915 corresponds to the animation graph 414B in FIG. 4D.

In some implementations, the initial motion graph includes edges between nodes with related asset poses among the plurality of asset poses, and wherein a first node associated with a first asset pose is connected to a second node associated with a second asset pose with an edge when the first asset pose matches the asset pose within a specified tolerance. For example, the specified tolerance corresponds to a deterministic or non-deterministic value.

In some implementations, the initial motion graph includes directed edges between nodes with related actions among the plurality of actions, and wherein a first node associated with a first action is connected to a second node associated with a second action with a directed edge when an end state of the first action matches an initial state of the second action.

As represented by block 10-3, the method 1000 includes providing the initial motion graph to a graph network. In some implementations, as represented by block 10-3a, the graph neural network corresponds to a graph convolutional network (GCN), a graph attention network (GAN), or a gated graph sequence neural network (GGS-NN). As shown in FIGS. 8D and 9B, the graph neural network 830 ingests the initial motion graph 822 and generates modified motion graph 832.

As represented by block 10-4, after providing the initial motion graph to the graph neural network, the method 1000 includes obtaining a modified motion graph including at least one of: a greater number of edges than the initial motion graph or a lesser number of edges than the initial motion graph. As shown in FIGS. 8D and 9B, the graph neural network 830 outputs a modified motion graph 832 based on the initial motion graph 822. FIG. 9C, for example, illustrates the modified motion graph 832, which is described in more detail above. In this example, the modified motion graph 832 in FIG. 8C includes the addition of the edge 846J and the removal of the edge 846H as compared to the initial motion graph 822 in FIG. 8B.

According to some implementations, the graph neural network simulates removing one or more edges between nodes within the initial motion graph. According to some implementations, the graph neural network simulates adding one or more edges between nodes within the initial motion graph.

According to some implementations, the graph neural network simulates removing one or more directed edges between nodes within the initial motion graph. According to some implementations, wherein the graph neural network simulates adding one or more directed edges between nodes within the initial motion graph.

As discussed above with respect to FIGS. 8D and 9D, during runtime, the modified motion graph 832 is provided to the content manager 620 for subsequent rendering by the rendering engine 650 shown in FIG. 6A. According to some implementations, the computing system obtains (e.g., receives, retrieves, or generates) a skeletal or structural rig for the asset for subsequent animation and/or rendering by the rendering engine 650 by applying the modified motion graph 832 to the skeletal or structural rig for the asset.

As discussed above with respect to FIGS. 8A and 9A, during a training routine for the graph neural network 830, the computing system or a component thereof (e.g., the evaluator 835) may generate an error value by comparing the initial motion graph 822 and the modified motion graph 832. According to a determination that the error value satisfies (e.g., exceeds) a threshold training value, the computing system determines that the graph neural network 830 is trained for runtime usage and exits the training routine. According to a determination that the error value does not satisfy (e.g., does not exceed) the threshold training value, the computing system or a component thereof (e.g., the evaluator 835) determines modified values for one or more control/operating parameters 836 of the graph neural network 830, such as filter weights or the like, based on the error value, implements the modified values for one or more control/operating parameters 836, and proceeds to a subsequent iteration of the training routine.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:
1. A method comprising:
at a computing system including non-transitory memory and one or more processors, wherein the computing system is communicatively coupled to a display device and one or more input devices:
obtaining a plurality of pre-existing animations;
determining an initial motion state and an end motion state for each of the plurality of pre-existing animations;
generating an animation graph including nodes for each of the plurality of pre-existing animations by connecting, with a directional edge, a first node with an end motion state to a second node with an initial motion state that matches the end motion state of the first node;
generating a transitional animation that is not included among the plurality of pre-existing animations from an initial reference motion state to a target motion state that corresponds to a path that traverses the animation graph from a third node associated with the initial reference motion state to a fourth node associated with the target motion state;
updating the animation graph by:
inserting a machine learning (ML) sub-system into the animation graph to generate a non-transitional output motion or a transitional output motion; or
replacing a non-transitional node within the animation graph with a ML sub-system to generate a non-transitional output motion or a transitional output motion.

2. The method of claim 1, wherein the plurality of pre-existing animations is associated with a virtual agent (VA).

3. The method of claim 2, further comprising:
presenting, via the display device, the VA performing the transitional animation.

4. The method of claim 3, wherein the display device corresponds to a transparent lens assembly, and wherein the presentation of the VA performing the transitional animation is projected onto the transparent lens assembly.

5. The method of claim 3, wherein the display device corresponds to a near-eye system, and wherein presenting the VA performing the transitional animation includes compositing the presentation of the VA performing the transitional animation with one or more images of a physical environment captured by an exterior-facing image sensor.

6. The method of claim 2, further comprising:
obtaining an initial reference motion state and a target motion state;
determining one or more candidate paths through the animation graph based on the initial reference motion state and the target motion state;
selecting a respective candidate path from among the one or more candidate paths;
generating a motion output based on the respective candidate path; and
presenting, via the display device, the VA performing the motion output.

7. The method of claim 6, wherein the motion output corresponds to a sequence of two or more actions or motions states.

8. The method of claim 2, wherein the VA corresponds to one of a humanoid, an animal, a robot, or a vehicle.

9. The method of claim 1, further comprising:
adding one or more nodes to the animation graph to increase a number of connected nodes and/or to connect unconnected nodes.

10. The method of claim 1, further comprising:
generating a motion graph by encoding the plurality of pre-existing animations according to one or more embedding space parameters, wherein the animation graph is generated by connecting, with the directional edge, the first node with the end motion state to the second node with the initial motion state that matches the end motion state of the first node based on the motion graph.

11. The method of claim 10, wherein the one or more embedding space parameters correspond to at least one of: intended inputs associated with the motion graph, intended outputs associated with the motion graph, labels associated with the plurality of pre-existing animations, and metadata associated with the plurality of pre-existing animations.

12. The method of claim 1, wherein the ML sub-system corresponds to one of a neural network (NN), a convolutional neural network (CNN), a recurrent neural network (RNN), a deep neural network (DNN), a support-vector machine (SVM), a relevance vector machine (RVM), or a random forest algorithm.

13. The method of claim 1, further comprising:
training the ML sub-system by reducing an error value of random walks through the animation graph.

14. A device comprising:
one or more processors;
a non-transitory memory;
an interface for communicating with a display device and one or more input devices; and
one or more programs stored in the non-transitory memory, which, when executed by the one or more processors, cause the device to:
obtain a plurality of pre-existing animations;
determine an initial motion state and an end motion state for each of the plurality of pre-existing animations;
generate an animation graph including nodes for each of the plurality of pre-existing animations by connecting, with a directional edge, a first node with an end motion state to a second node with an initial motion state that matches the end motion state of the first node;
generate a transitional animation that is not included among the plurality of pre-existing animations from an initial reference motion state to a target motion state that corresponds to a path that traverses the animation graph from a third node associated with the initial reference motion state to a fourth node associated with the target motion state; and
update the animation graph by inserting a machine learning (ML) sub-system into the animation graph to generate a non-transitional output motion or a transitional output motion; or
replacing a non-transitional node within the animation graph with a ML sub-system to generate a non-transitional output motion or a transitional output motion.

15. The device of claim 14, wherein the plurality of pre-existing animations is associated with a virtual agent (VA).

16. The device of claim 15, wherein the one or more programs further cause the device to:
obtain an initial reference motion state and a target motion state;
determine one or more candidate paths through the animation graph based on the initial reference motion state and the target motion state;
select a respective candidate path from among the one or more candidate paths;
generate a motion output based on the respective candidate path; and
present, via the display device, the VA performing the motion output.

17. The device of claim 16, wherein the motion output corresponds to a sequence of two or more actions or motions states.

18. The device of claim 14, wherein the one or more programs further cause the device to:
generate a motion graph by encoding the plurality of pre-existing animations according to one or more embedding space parameters, wherein the animation graph is generated by connecting, with the directional edge, the first node with the end motion state to the second node with the initial motion state that matches the end motion state of the first node based on the motion graph.

19. A non-transitory memory storing one or more programs, which, when executed by one or more processors of a device with an interface for communicating with a display device and one or more input devices, cause the device to:
  obtain a plurality of pre-existing animations;
  determine an initial motion state and an end motion state for each of the plurality of pre-existing animations;
  generate an animation graph including nodes for each of the plurality of pre-existing animations by connecting, with a directional edge, a first node with an end motion state to a second node with an initial motion state that matches the end motion state of the first node;
  generate a transitional animation that is not included among the plurality of pre-existing animations from an initial reference motion state to a target motion state that corresponds to a path that traverses the animation graph from a third node associated with the initial reference motion state to a fourth node associated with the target motion state; and
  update the animation graph by:
    inserting a machine learning (ML) sub-system into the animation graph to generate a non-transitional output motion or a transitional output motion; or
    replacing a non-transitional node within the animation graph with a ML sub-system to generate a non-transitional output motion or a transitional output motion.

20. The non-transitory memory of claim 19, wherein the plurality of pre-existing animations is associated with a virtual agent (VA).

21. The non-transitory memory of claim 20, wherein the one or more programs further cause the device to:
  obtain an initial reference motion state and a target motion state;
  determine one or more candidate paths through the animation graph based on the initial reference motion state and the target motion state;
  select a respective candidate path from among the one or more candidate paths;
  generate a motion output based on the respective candidate path; and
  present, via the display device, the VA performing the motion output.

22. The non-transitory memory of claim 21, wherein the motion output corresponds to a sequence of two or more actions or motions states.

23. The non-transitory memory of claim 19, wherein the one or more programs further cause the device to:
  generate a motion graph by encoding the plurality of pre-existing animations according to one or more embedding space parameters, wherein the animation graph is generated by connecting, with the directional edge, the first node with the end motion state to the second node with the initial motion state that matches the end motion state of the first node based on the motion graph.

* * * * *